(12) United States Patent
Inoue et al.

(10) Patent No.: US 12,283,865 B2
(45) Date of Patent: Apr. 22, 2025

(54) ELECTRIC MOTOR AND MANUFACTURING METHOD THEREOF

(71) Applicant: MITSUBA Corporation, Gunma (JP)

(72) Inventors: Masaki Inoue, Gunma (JP); Tetsuya Watanabe, Gunma (JP); Tomonori Saito, Gunma (JP)

(73) Assignee: MITSUBA Corporation, Gunma (JP)

( * ) Notice: Subject to any disclaimer, the term of this patent is extended or adjusted under 35 U.S.C. 154(b) by 231 days.

(21) Appl. No.: 17/834,860

(22) Filed: Jun. 7, 2022

(65) Prior Publication Data

US 2022/0407383 A1 Dec. 22, 2022

(30) Foreign Application Priority Data

Jun. 17, 2021 (JP) .................................. 2021-100716

(51) Int. Cl.
*H02K 5/22* (2006.01)

(52) U.S. Cl.
CPC .................................. *H02K 5/225* (2013.01)

(58) Field of Classification Search
CPC .... H02K 5/225; H02K 2203/06; H02K 3/522; H02K 11/215; H02K 21/16; H02K 3/50; H02K 15/0068
See application file for complete search history.

(56) References Cited

U.S. PATENT DOCUMENTS

| 2003/0020344 A1* | 1/2003 | Futami | H02K 3/522 |
| | | | 310/71 |
| 2022/0263370 A1* | 8/2022 | Ruppert | H02K 3/50 |

FOREIGN PATENT DOCUMENTS

| JP | 2000266083 | 9/2000 |
| JP | 2017073860 | 4/2017 |

* cited by examiner

*Primary Examiner* — Terrance L Kenerly
*Assistant Examiner* — Riley Owen Stout
(74) *Attorney, Agent, or Firm* — JCIPRNET

(57) ABSTRACT

Notch bottom parts 152a, 152b are arranged side-by-side with terminal accommodation boxes 100a, 100b in a circumferential direction of an insulator 134, and a routing direction of a pair of coil ends 44a inside the terminal accommodation boxes 100a, 100b is directed to a direction intersecting with an insertion direction of flat-type male terminals T1, T2. Accordingly, at the time of inserting the flat-type male terminals T1, T2 into the terminal accommodation boxes 100a, 100b, an unreasonable force is suppressed from being applied to the pair of coil ends 44a, and, as a result, a defect such as disconnection of the pair of coil ends 44a can be prevented from occurring. In addition, it is possible to orderly route the pair of coil ends 44a on the insulator 43 via the notch bottom parts 152a, 152b, and, as a result, a short circuit with another coil 44 can be prevented.

8 Claims, 18 Drawing Sheets

ELECTRIC MOTOR AND MANUFACTURING METHOD THEREOF

CROSS-REFERENCE TO RELATED APPLICATION

This application claims the priority benefit of Japan application serial no. 2021-100716, filed on Jun. 17, 2021. The entirety of the above-mentioned patent application is hereby incorporated by reference herein and made a part of this specification.

BACKGROUND

Technical Field

The invention relates to an electric motor including a stator on which multiple conductive wires are wound, a rotor rotating with respect to the stator, and a holder member holding the stator, and a manufacturing method of the electric motor.

Description of Related Art

Patent Document 1 discloses an electric motor (brushless motor) in which ends of multiple coils (conductive wires) wound on a stator core (stator) are each individually electrically connected to multiple terminals (connection terminals) through soldering. In addition, the terminals electrically connected to the coils are each individually electrically connected to a control substrate through soldering.

Moreover, Patent Document 2 discloses a conductive wire connection terminal member in which, by pressing and installing a terminal member (connection terminal) having a slit to a case in which an end of a winding (conductive wire) is set, the end of the winding enters the slit, and thus the winding and the terminal member are electrically connected. If the conductive wire connection terminal member disclosed in Patent Document 2 is adopted, a process for electrical connection through soldering is not required.

PRIOR ART DOCUMENTS

Patent Documents

[Patent Document 1] Japanese Laid-open No. 2017-073860
[Patent Document 2] Japanese Laid-open No. 2000-266083

In order to facilitate the assemability of the brushless motor, three connection terminals supplying driving currents to U-phase, V-phase, and W-phase conductive wires, respectively, may be consolidated on a side in the radial direction of a case forming the brushless motor. In addition, the connection terminals and the conductive wires may be electrically connected without soldering. To cope with such needs, it is necessary to route the conductive wires drawn from the stator in the circumferential direction of the case to be arranged at a predetermined place (the place where the connection terminals are consolidated) and press the connection terminals at such portion to be electrically connected with the corresponding conductive wires.

However, in the arrangement in which the conductive wires drawn from the stator are simply routed to be arranged at the predetermined place and the connection terminals are pressed at the portion to be respectively electrically connected to the corresponding conductive wires, for example, a defect such as a short circuit between the V-phase conductive wire and the U-phase connection terminal, an unreasonable force applied to the conductive wire when the connection terminal is pressed, which leads to disconnection of the conductive wire, etc., may occur.

SUMMARY

An electric motor according to an aspect of the invention includes: a stator, around which a plurality of conductive wires are wound; a rotor, rotating with respect to the stator; and a holder member, holding the stator. The electric motor is provided with: a terminal accommodation box, which is provided on a radially outer side of the holder member and through which the conductive wires are inserted; a connection terminal, inserted into the terminal accommodation box from a direction intersecting with the conductive wires and electrically connecting the conductive wires with each other; and a first conductive wire regulation part, provided to be arranged side-by-side with the terminal accommodation box in a circumferential direction of the holder member and directing a routing direction of the conductive wires inside the terminal accommodation box to a direction intersecting with an insertion direction of the connection terminal.

Another aspect of the invention provides a manufacturing method of an electric motor. The electric motor includes: a stator, around which a plurality of conductive wires are wound; a rotor, rotating with respect to the stator; and a holder member, holding the stator. The manufacturing method of the electric motor includes: a first process of arranging the conductive wires along a circumferential direction of the holder member on a side in an axial direction of the holder member; a second process of routing the conductive wires to an other side in the axial direction of the holder member, and hooking the conductive wires on a first conductive wire regulation part disposed on the other side in the axial direction of the holder member; a third process of inserting the conductive wires hooked on the first conductive wire regulation part into a terminal accommodation box provided side-by-side with the first conductive wire regulation part in the circumferential direction of the holder member, and directing a routing direction of the conductive wires inside the terminal accommodation box to a direction intersecting with an insertion direction of a connection terminal inserted into the terminal accommodation box; and a fourth process of inserting the connection terminal into the terminal accommodation box in a direction intersecting with the conductive wires, and electrically connecting the conductive wires with each other.

DESCRIPTION OF THE EMBODIMENTS

The invention provides an electric motor and a manufacturing method thereof capable of facilitating the assemability without a defect such as a short circuit of the conductive wire or disconnection of the conductive wire.

According to the invention, the first conductive wire regulation part is provided to be side-by-side with the terminal accommodation box in the circumferential direction of the holder member and directs the routing direction of the conductive wires inside the terminal accommodation box to the direction intersecting with the insertion direction of the connection terminal. Accordingly, at the time of inserting the connection terminal into the terminal accommodation box, an unreasonable force is suppressed from being applied to the conductive wires, and, as a result, a defect such as disconnection of the conductive wire can be prevented from occurring. In addition, it is possible to orderly route the conductive wire on the holder member via the first conductive wire regulation part, and, as a result, a short circuit with the conductive wire of another phase can be prevented.

In the following, an embodiment of the invention is described with reference to the drawings.

Figure 1:
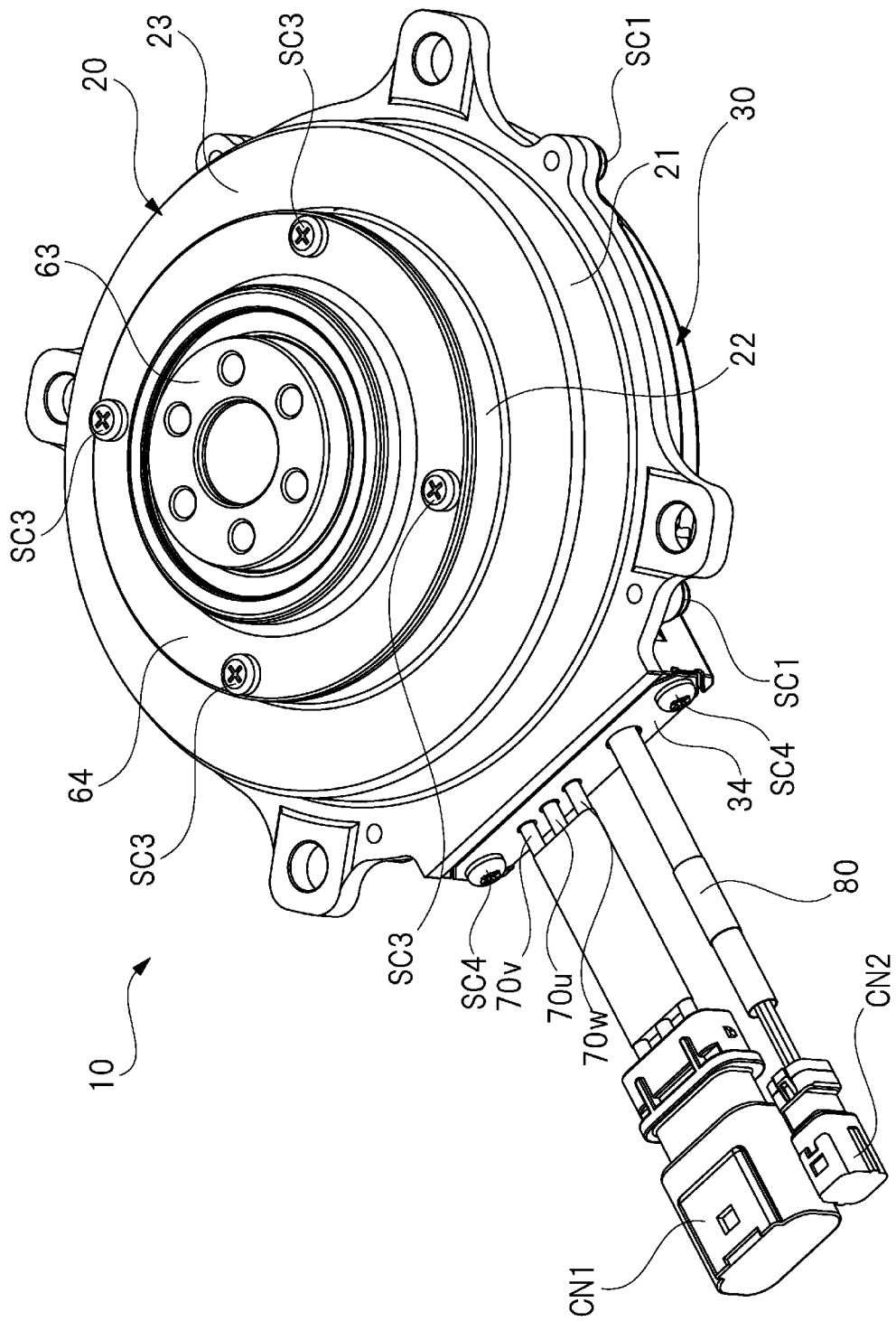
FIG. 1 is a perspective view illustrating an output rotator side of an electric motor.
Figure 2:
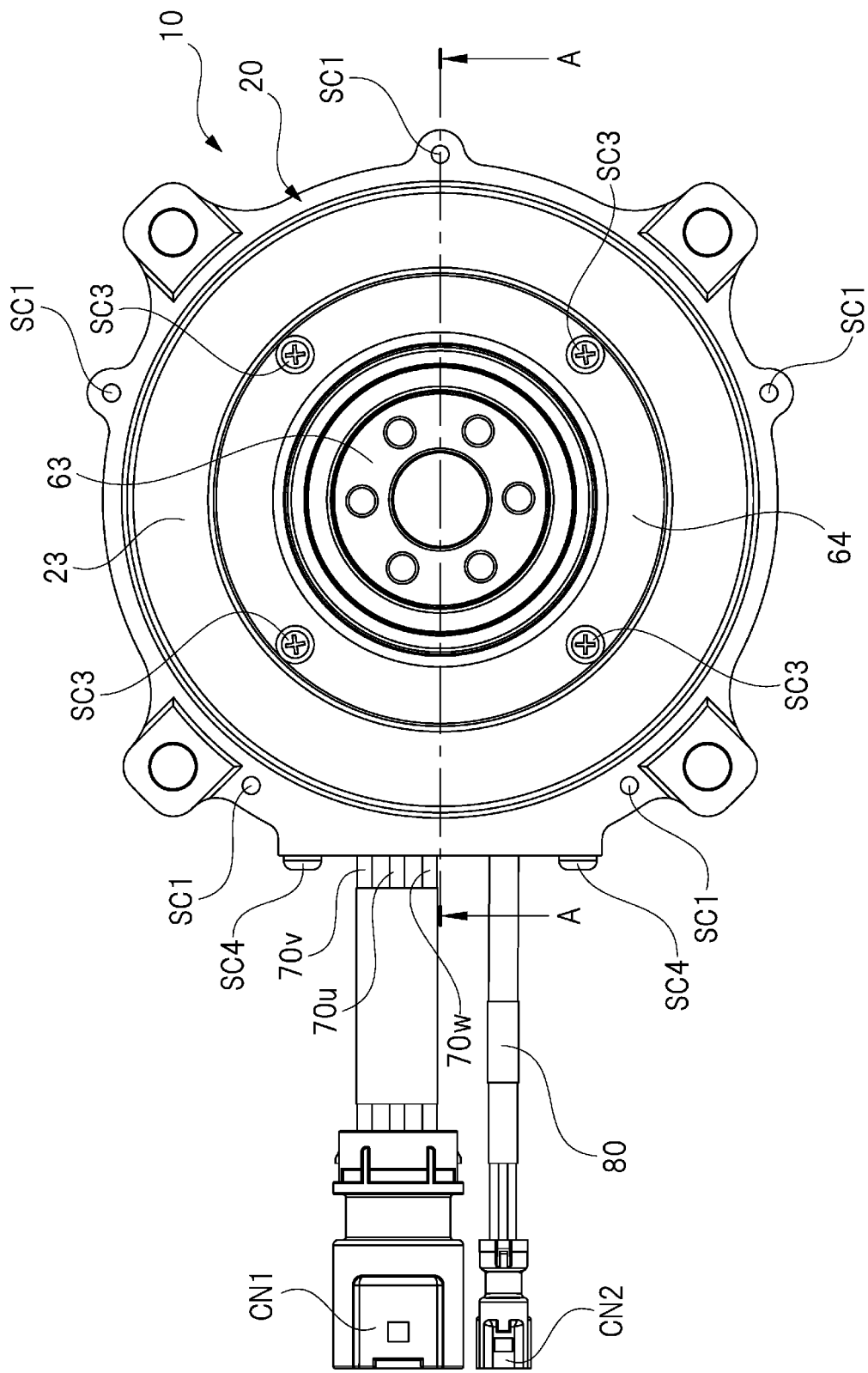
FIG. 2 is a plan view illustrating the output rotator side of the electric motor.
Figure 3:
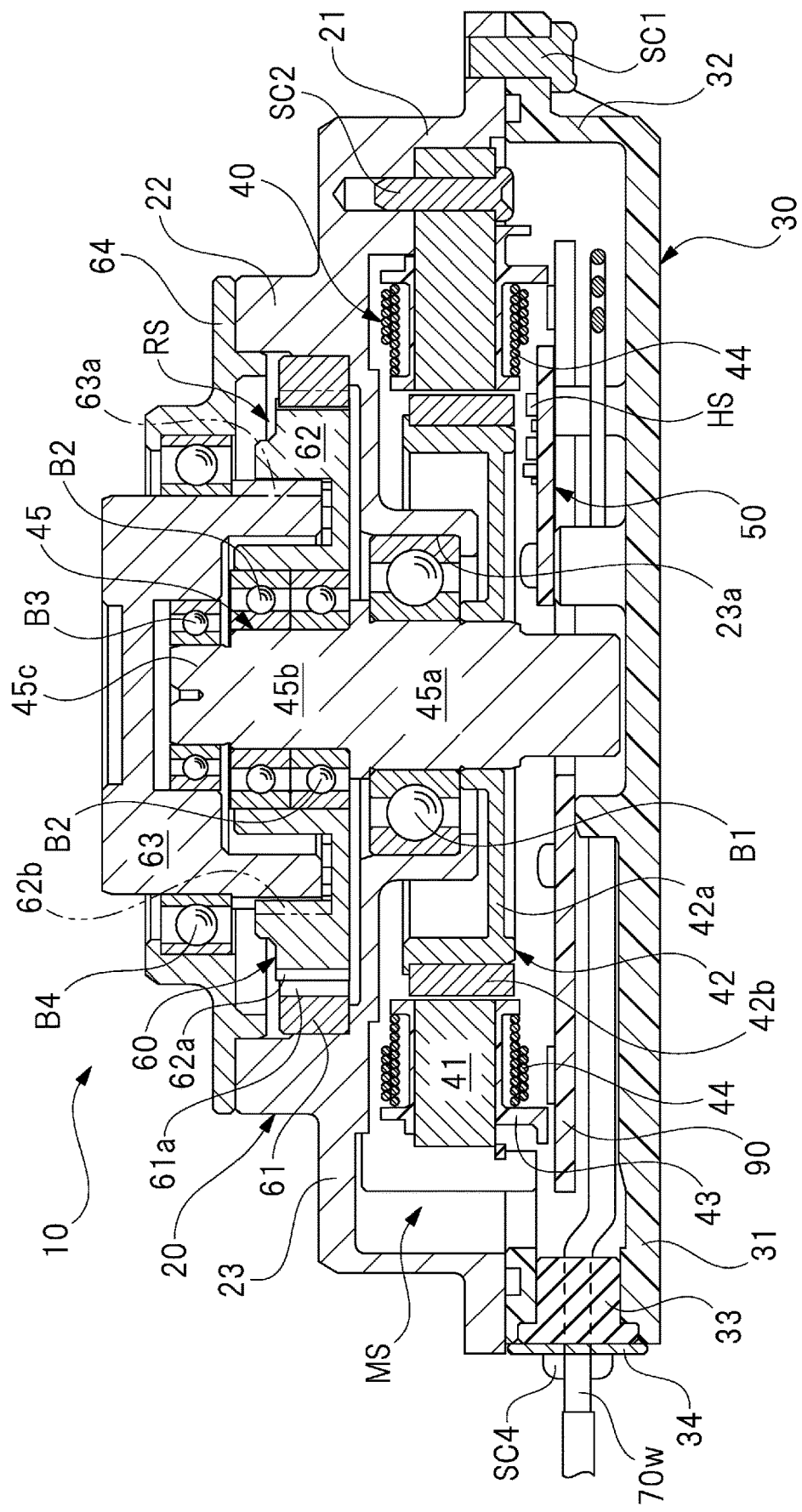
FIG. 3 is a cross-sectional view taken along line A-A of FIG. 2.
Figure 4:
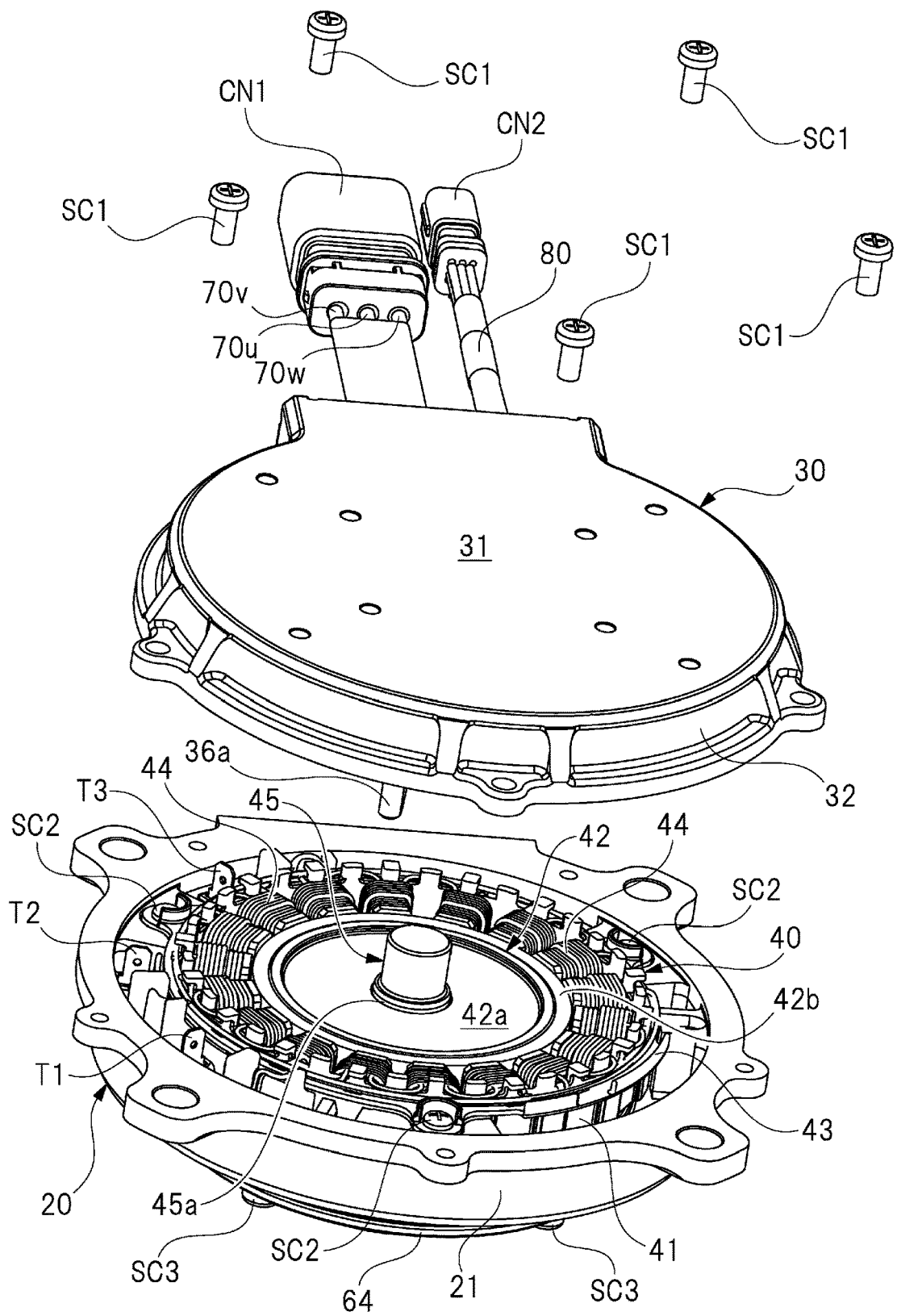
FIG. 4 is an exploded perspective view illustrating a cover side of the electric motor.
Figure 5:
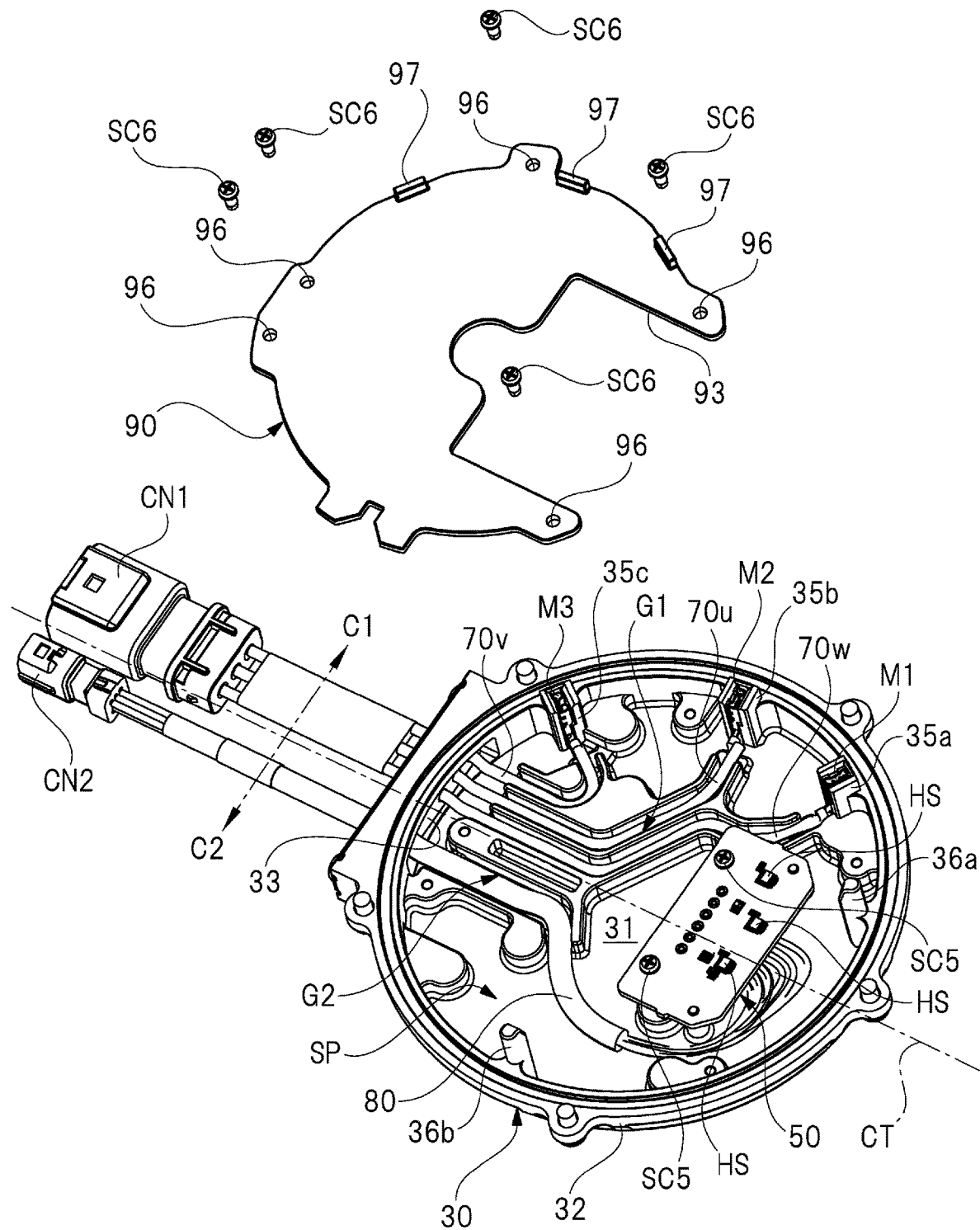
FIG. 5 is an exploded perspective view illustrating a configuration inside a cover.
Figure 6:
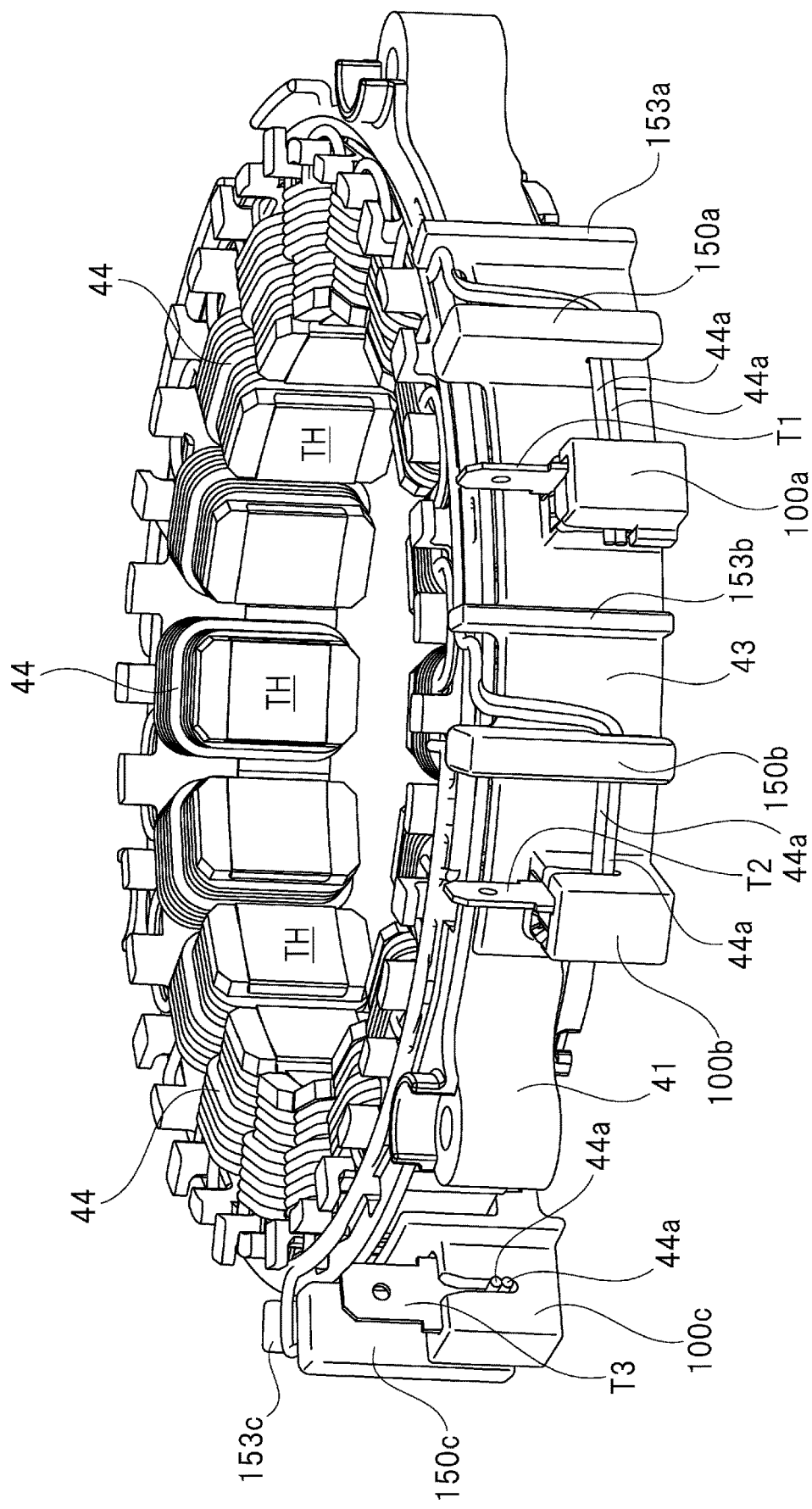
FIG. 6 is a perspective view of a stator core when viewed from a flat-type male terminal side.
Figure 7:
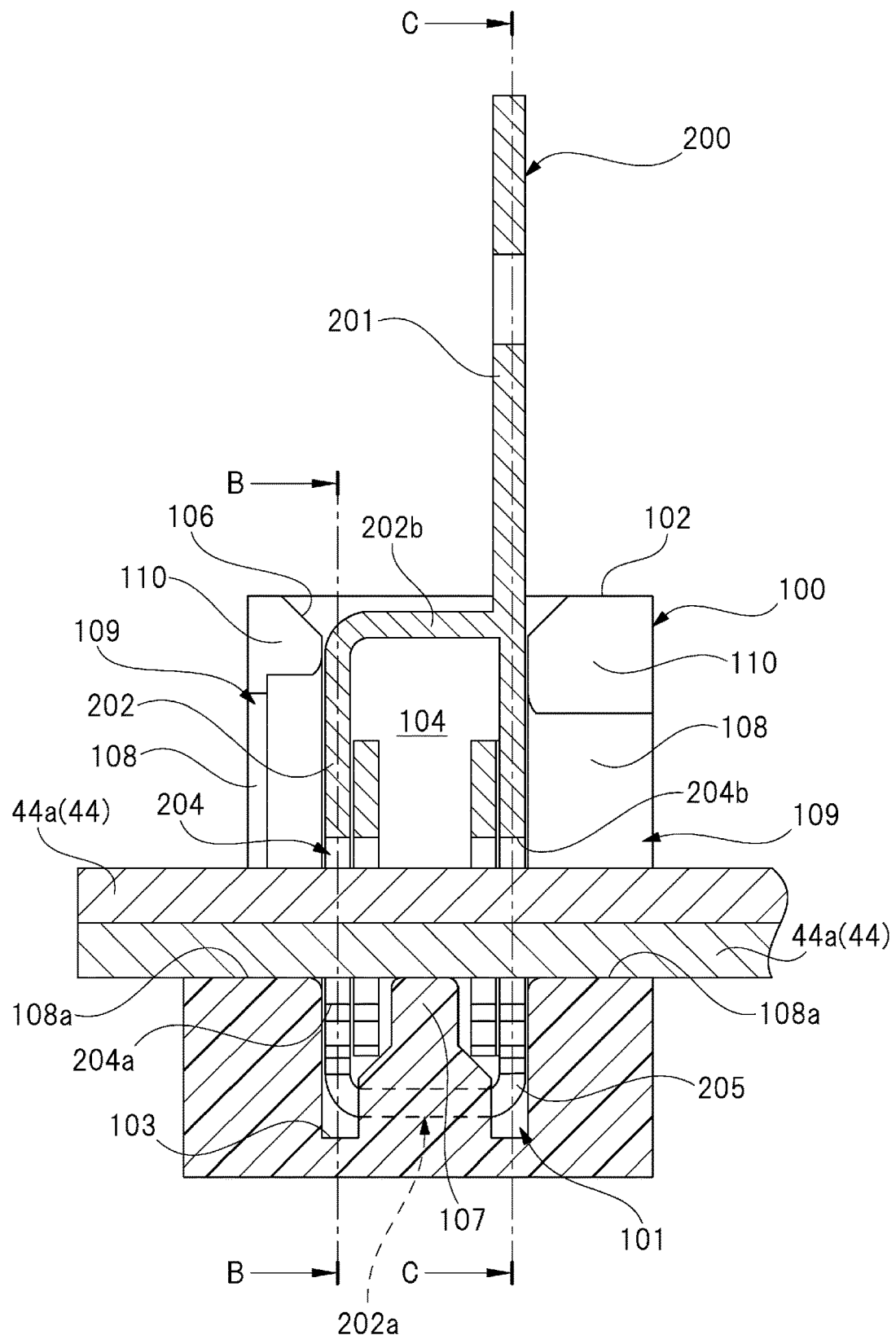
FIG. 7 is a cross-sectional view along an extending direction of a coil terminal of a terminal accommodation box.
Figure 8:
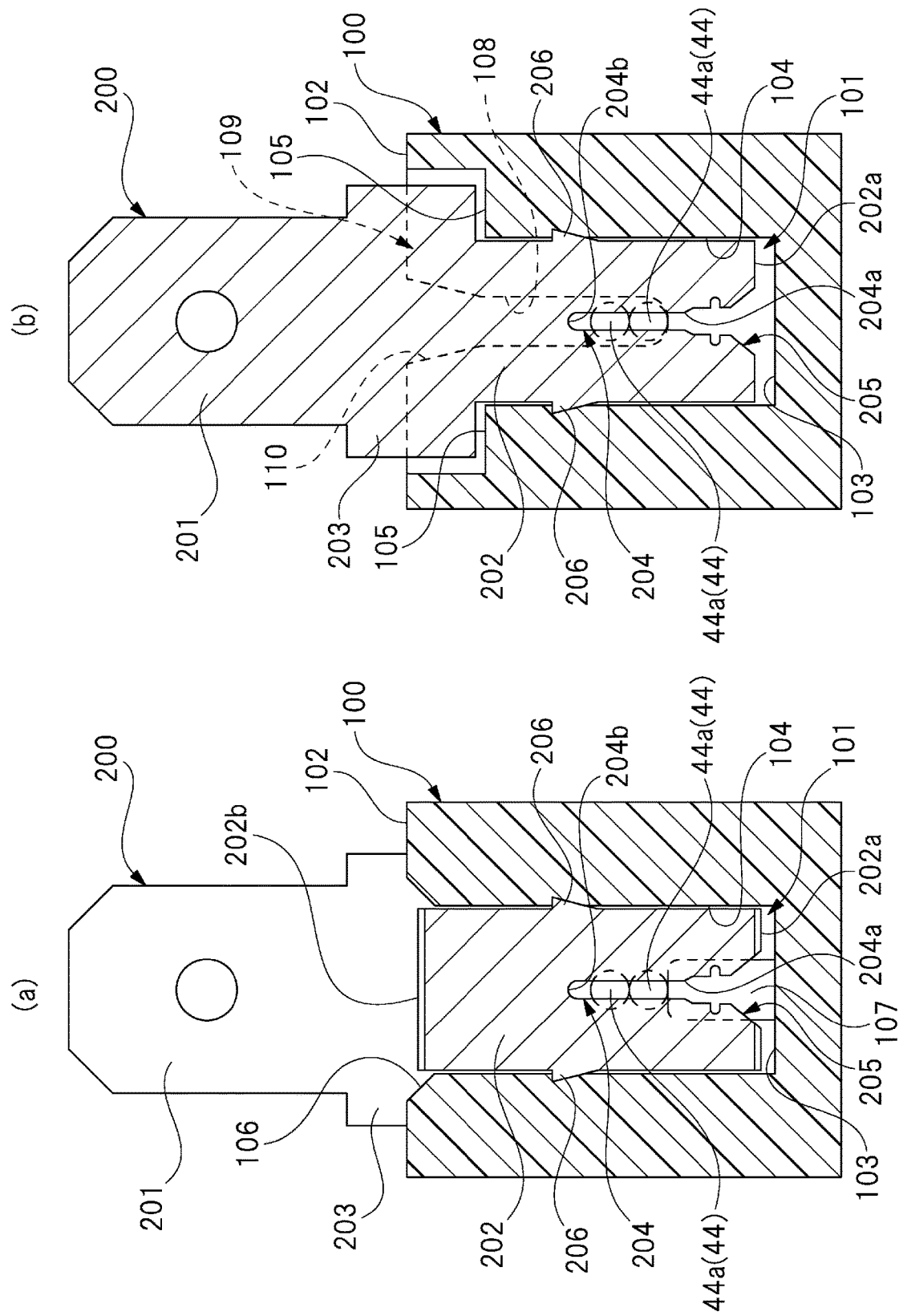
In FIG. 8, (a) is a cross-sectional view taken along line B-B of FIG. 7, and (b) is a cross-sectional view taken along line C-C of FIG. 7.
Figure 9:
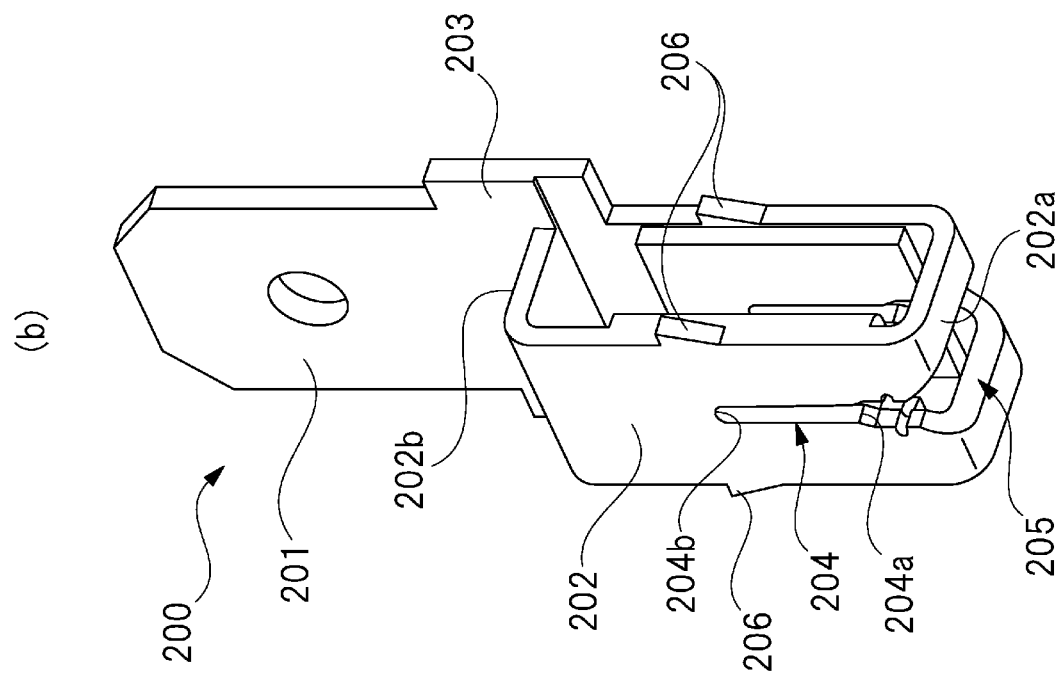
In FIG. 9, (a) and (b) are perspective views illustrating a detailed configuration of a flat-type male terminal.
Figure 9:
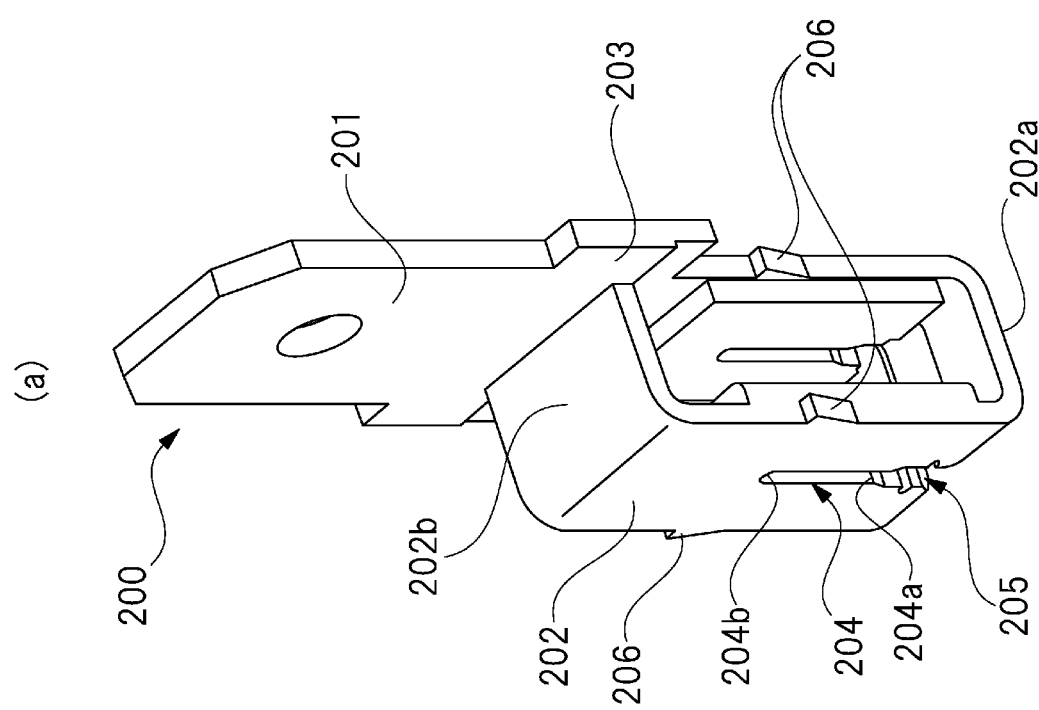
Figure 10:
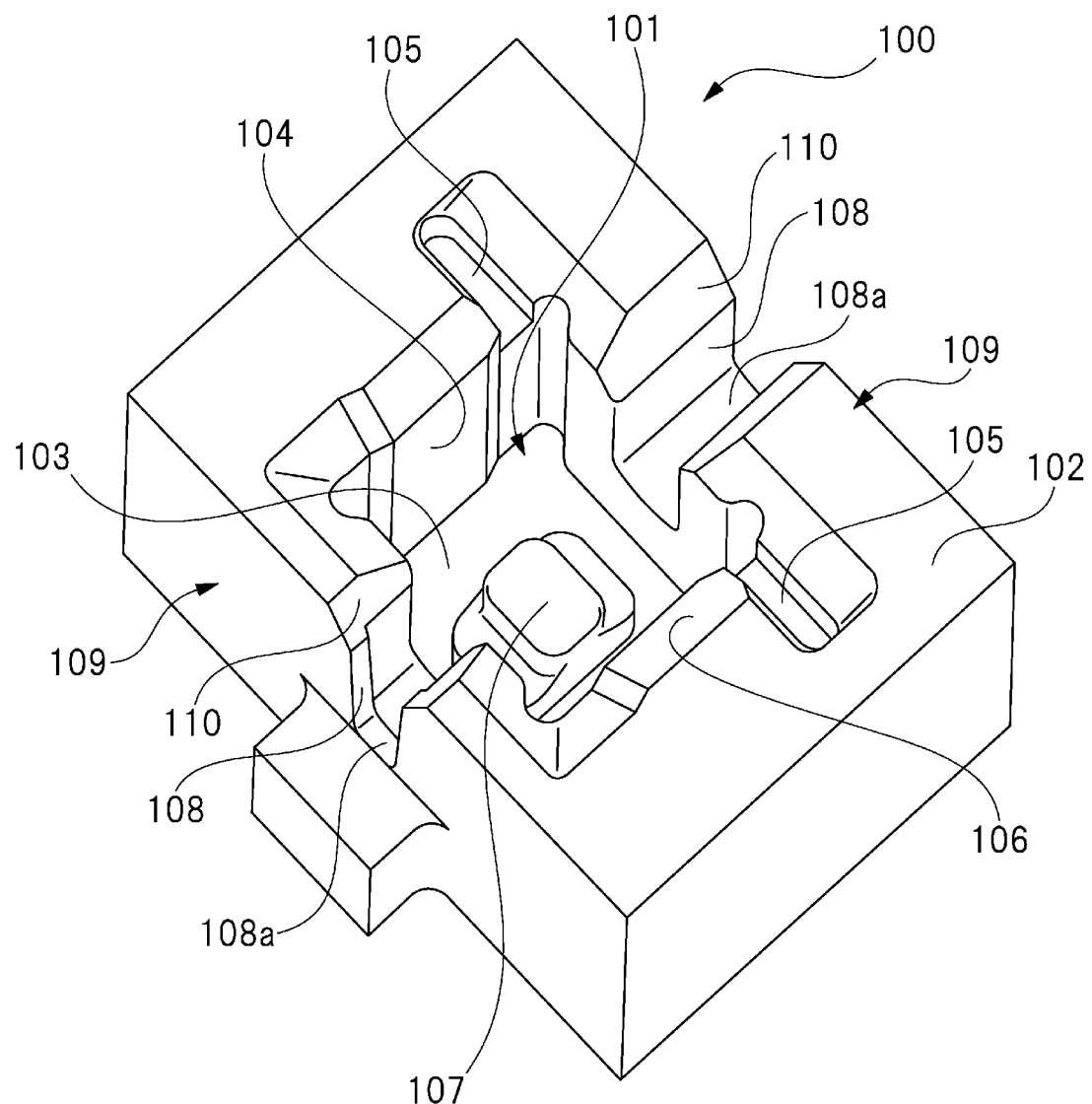
FIG. 10 is a perspective view illustrating a detailed configuration of the terminal accommodation box.
Figure 11:
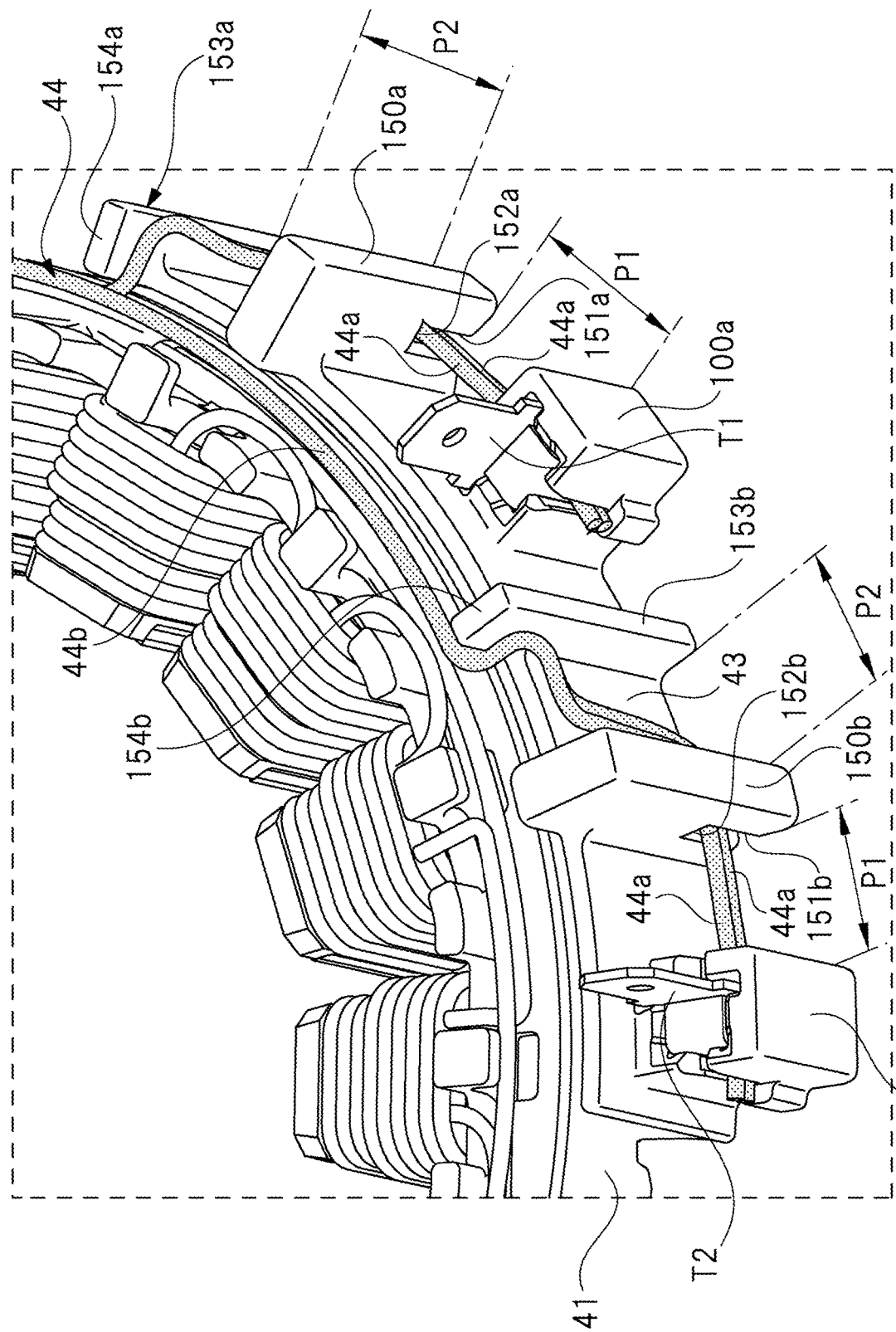
FIG. 11 is a perspective view in which a portion of terminal accommodation boxes for W-phase, U-phase is enlarged.
Figure 12:
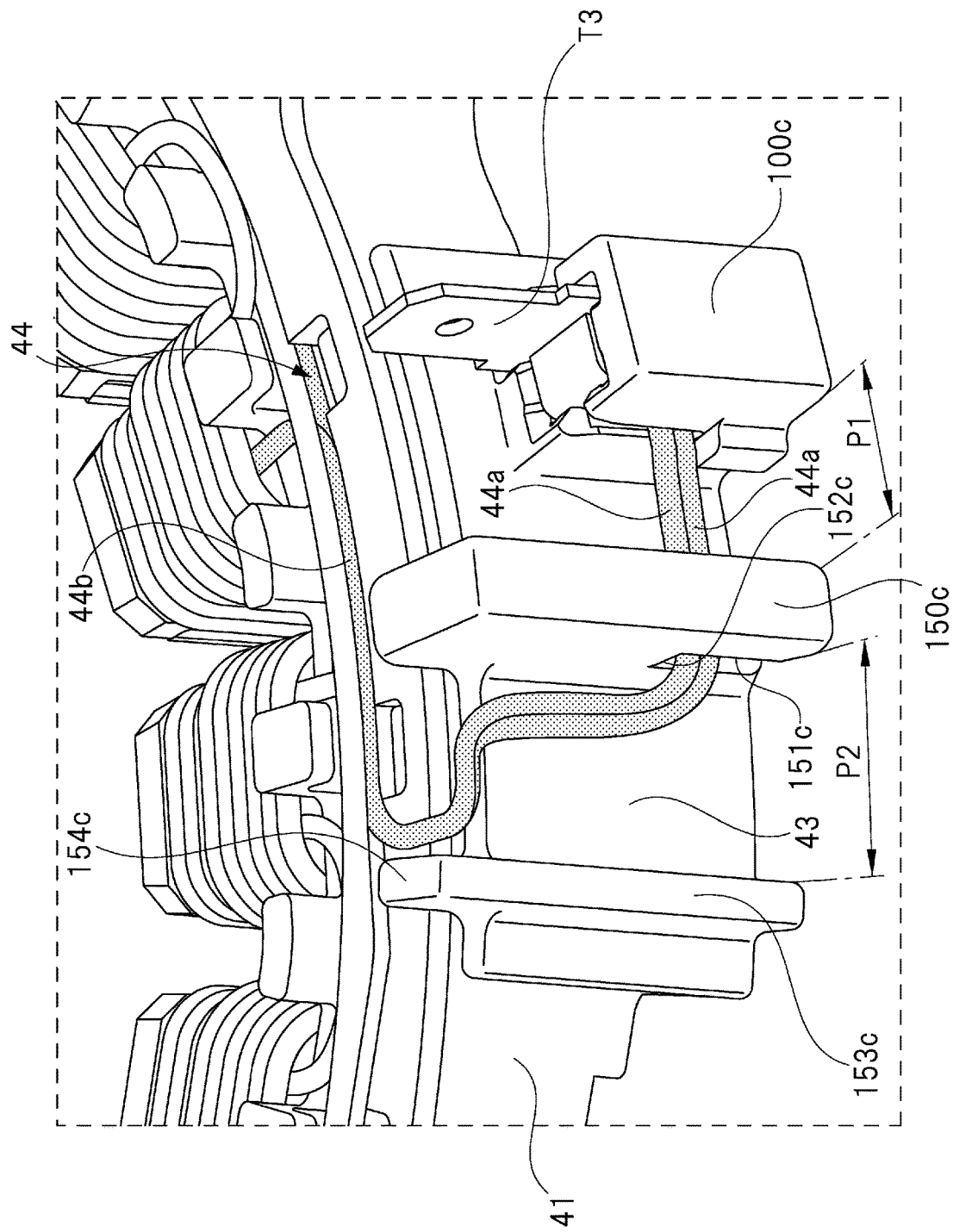
FIG. 12 is a perspective view in which a portion of a terminal accommodation box for V-phase is enlarged.

FIG. 1 is a perspective view illustrating an output rotator side of an electric motor. FIG. 2 is a plan view illustrating the output rotator side of the electric motor. FIG. 3 is a cross-sectional view taken along line A-A of FIG. 2. FIG. 4 is an exploded perspective view illustrating a cover side of the electric motor. FIG. 5 is an exploded perspective view illustrating a configuration inside a cover. FIG. 6 is a perspective view of a stator core when viewed from a flat-type male terminal side. FIG. 7 is a cross-sectional view along an extending direction of a coil terminal of a terminal accommodation box. In FIG. 8, (a) is a cross-sectional view taken along line B-B of FIG. 7, and (c) is a cross-sectional view taken along line C-C of FIG. 7. In FIG. 9, (a) and (b) are perspective views illustrating a detailed configuration of a flat-type male terminal. FIG. 10 is a perspective view illustrating a detailed configuration of the terminal accommodation box. FIG. 11 is a perspective view in which a portion of a terminal accommodation boxes for W-phase, U-phase is enlarged. FIG. 12 is a perspective view in which a portion of a terminal accommodation box for V-phase is enlarged.

Figure 13:
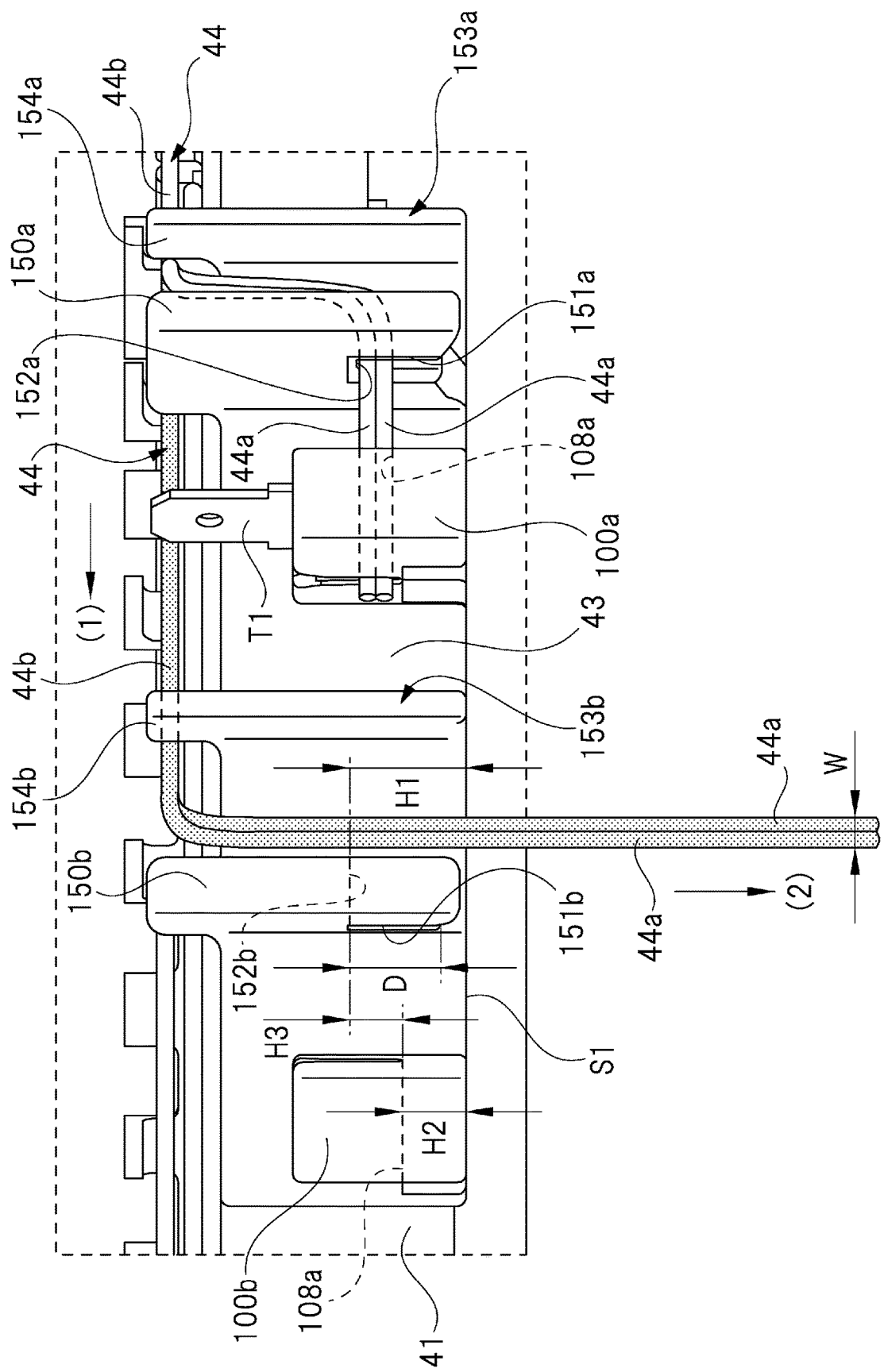
FIG. 13 is a view illustrating a first process and a prior stage (having a fifth process) of a second process in a terminal accommodation box for U-phase.
Figure 14:
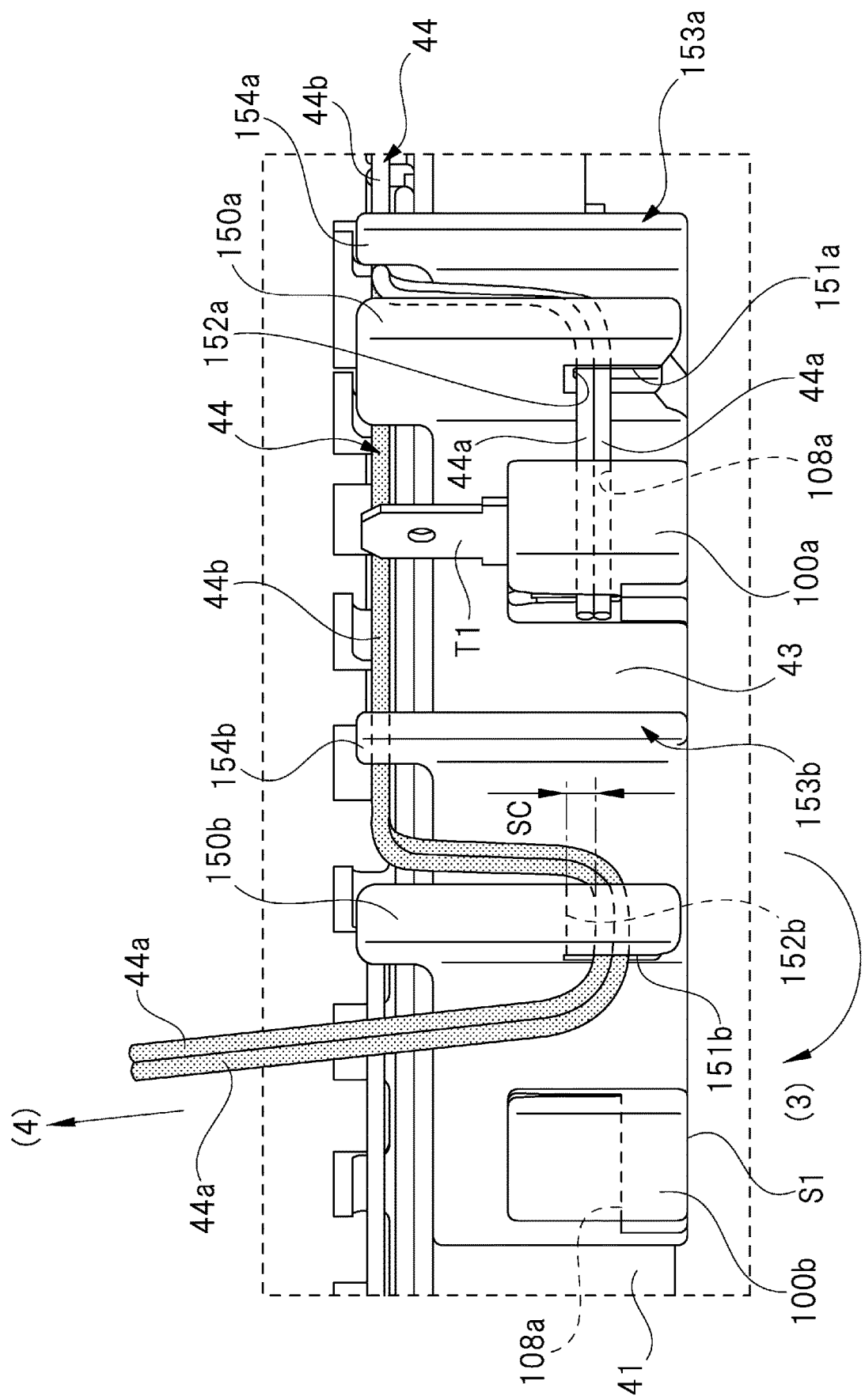
FIG. 14 is a view illustrating a later stage of the second process in the terminal accommodation box for U-phase.
Figure 15:
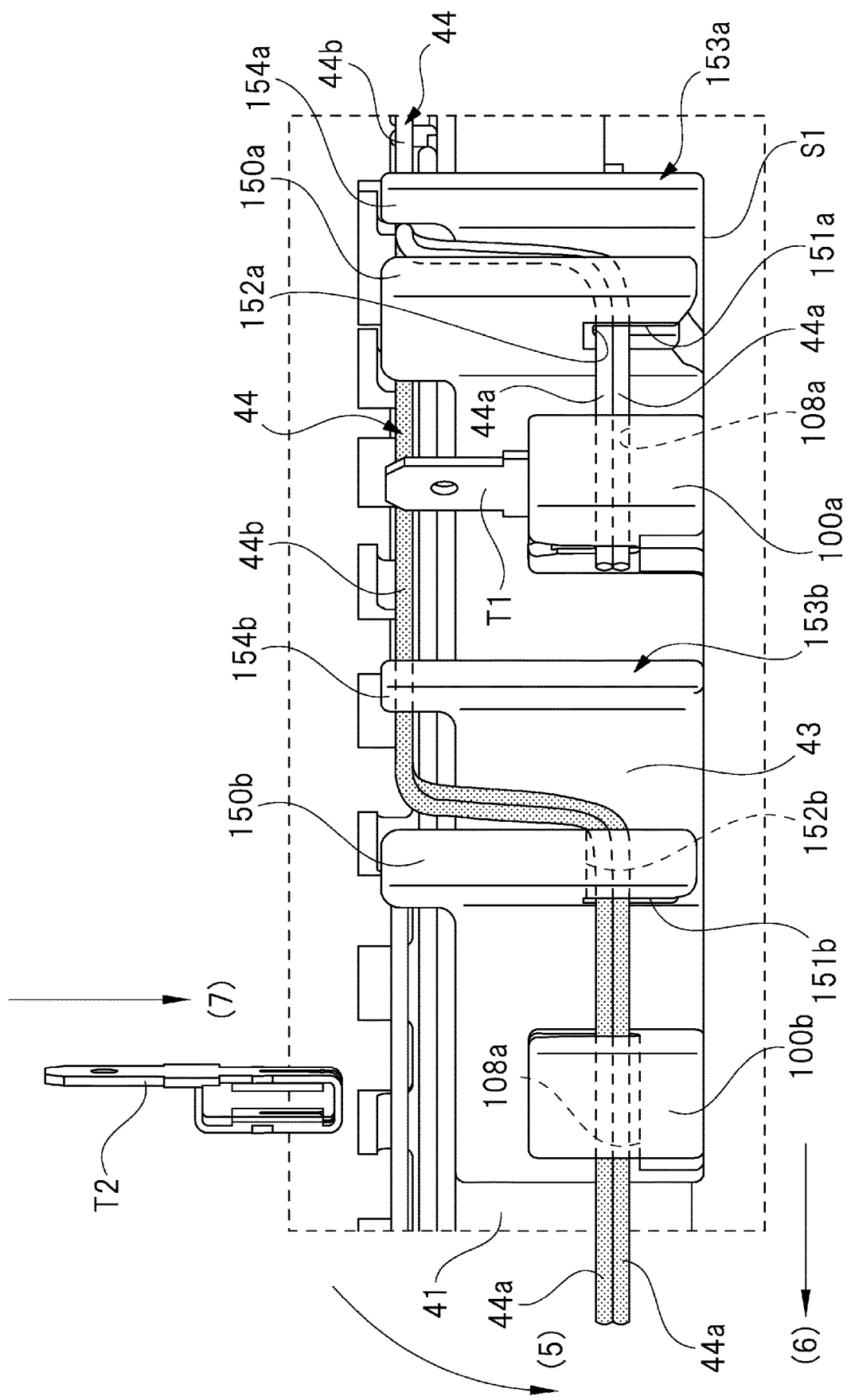
FIG. 15 is a view illustrating a third process and a fourth process in the terminal accommodation box for U-phase.
Figure 16:
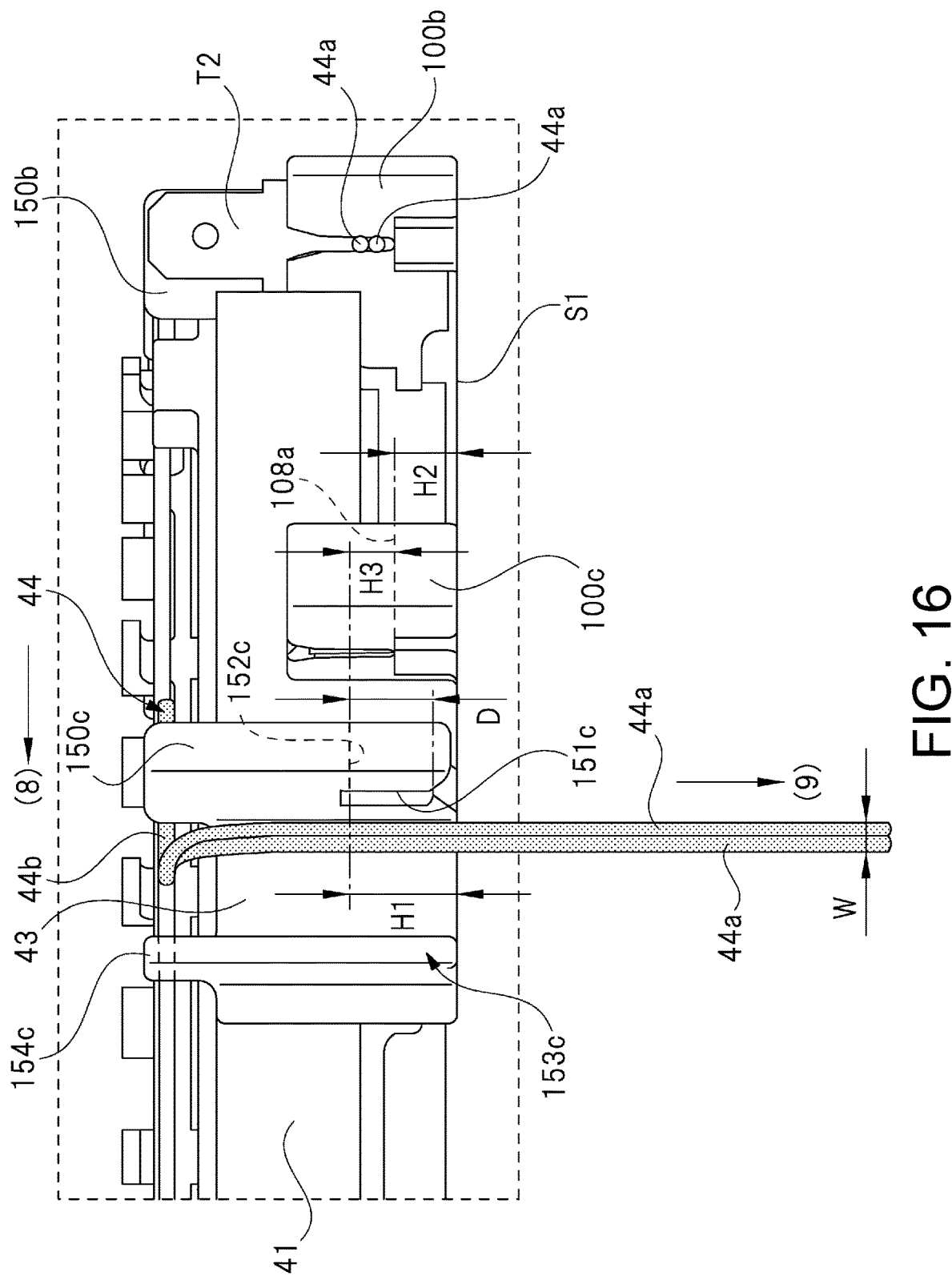
FIG. 16 is a view illustrating the first process and a prior stage (without the fifth process) of the second process in the terminal accommodation box for V-phase.
Figure 17:
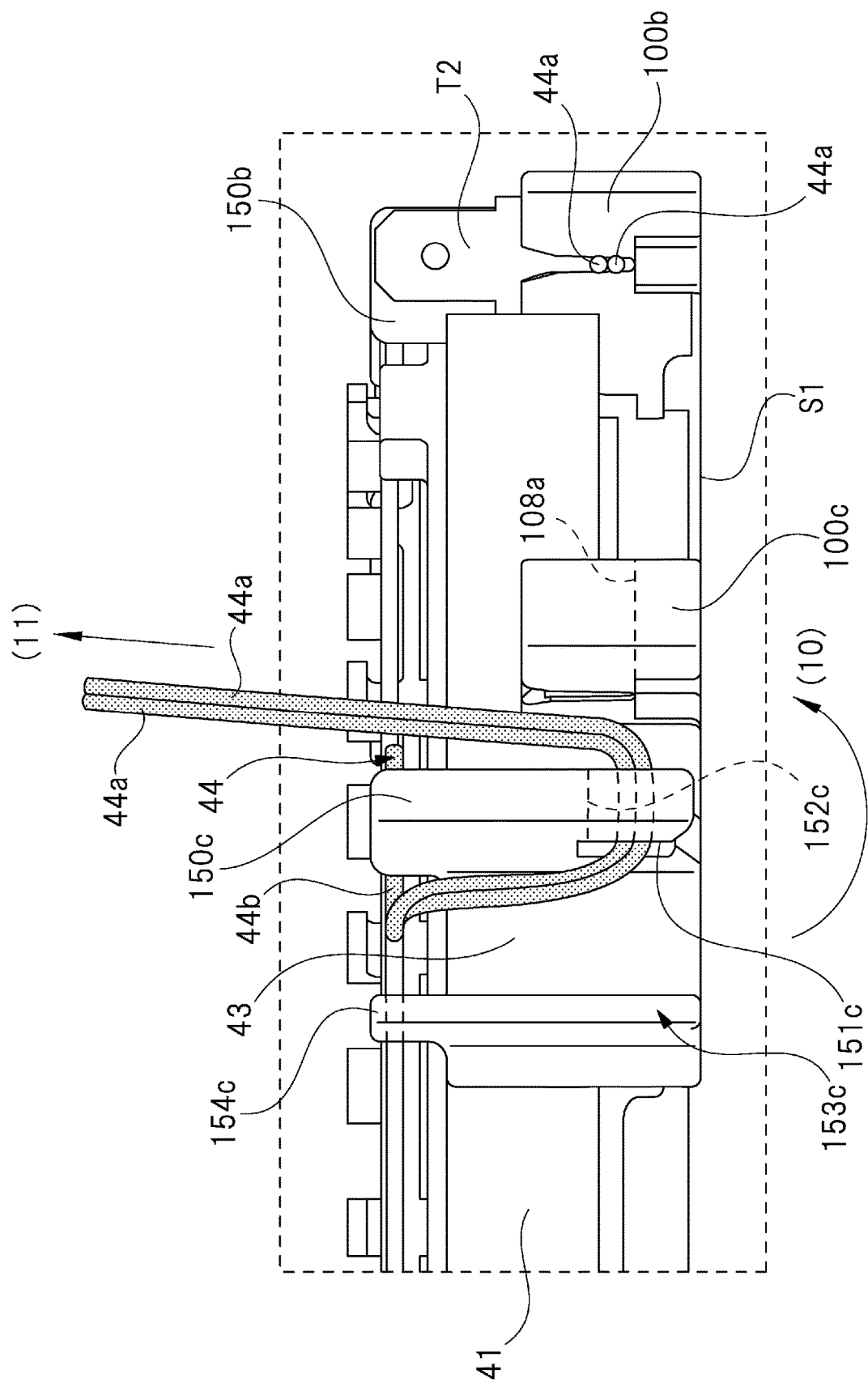
FIG. 17 is a view illustrating a later stage of the second process in the terminal accommodation box for V-phase.
Figure 18:
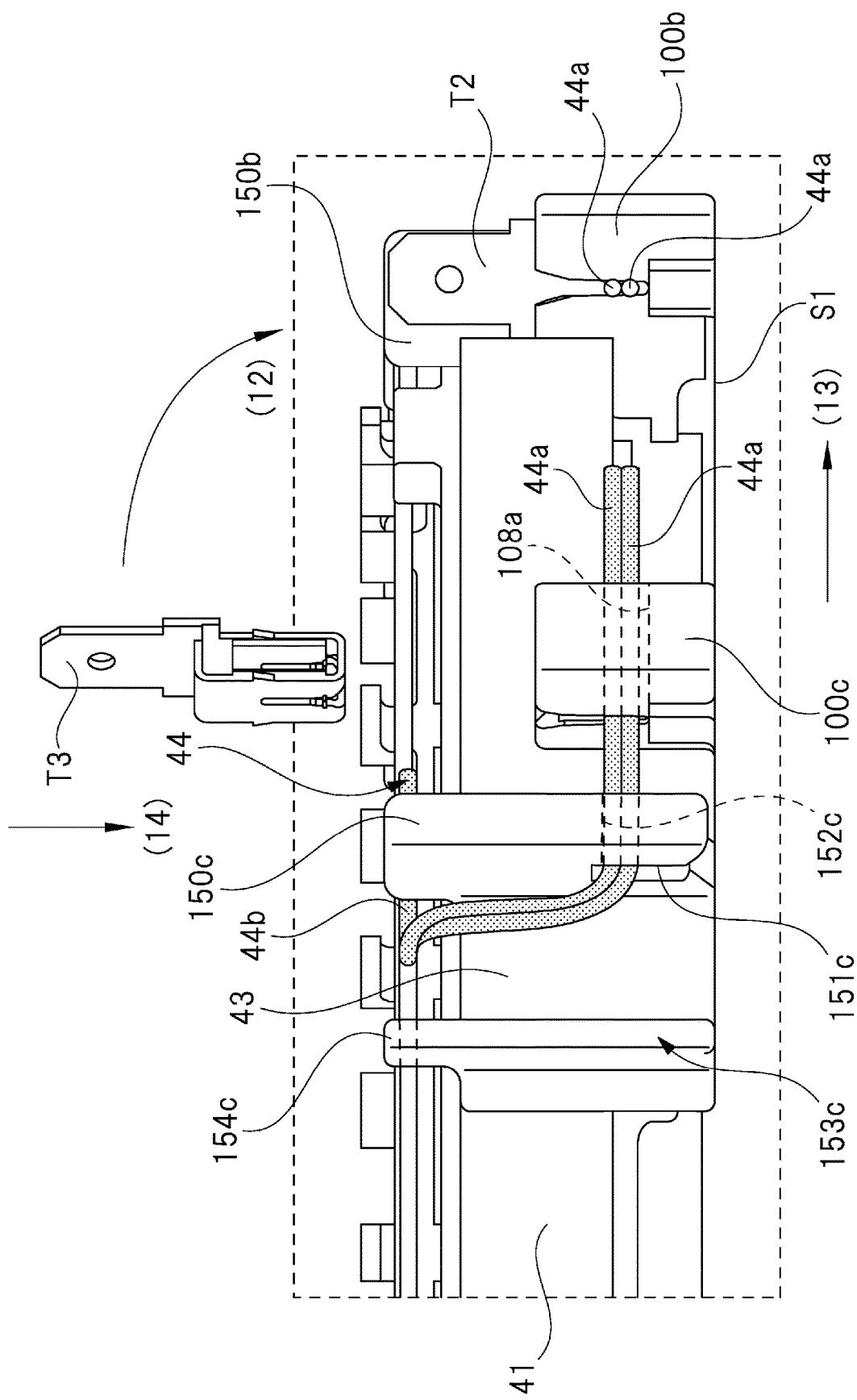
FIG. 18 is a view illustrating the third process and the fourth process in the terminal accommodation box for V-phase.

In addition, FIG. 13 is a view illustrating a first process and a prior stage (having a fifth process) of a second process in a terminal accommodation box for U-phase. FIG. 14 is a view illustrating a later stage of the second process in the terminal accommodation box for U-phase. FIG. 15 is a view illustrating a third process and a fourth process in the terminal accommodation box for a U-phase. FIG. 16 is a view illustrating the first process and a prior stage (without the fifth process) of the second process in the terminal accommodation box for V-phase. FIG. 17 is a view illustrating a later stage of the second process in the terminal accommodation box for V-phase. FIG. 18 is a view illustrating the third process and the fourth process in the terminal accommodation box for V-phase.

An electric motor 10 shown in FIG. 1 serves to drive a wheel (not shown) of an electric carrier carrying harvested farm products, and is a motor having a relatively high output. In the electric motor 10, through operation of an operational switch, etc., (not shown), a driving current is supplied from a battery, etc. Accordingly, the motor 10 is rotationally driven in a forward direction or a reverse direction at a predetermined rotation speed.

As shown in FIGS. 1 to 3, the electric motor 10 is formed in a substantially disc-shaped, flat shape, and is provided for a smaller size and a lighter weight. The electric motor 10 includes a case 20 and a cover 30 forming an outer profile thereof. The case 20 and the cover 30 are fixed by a total of five fixing screws SC1 in a state in which the case 20 and the cover 30 abut against each other.

As shown in FIG. 3, a motor accommodation room MS is formed inside the case 20 and the cover 30, and a flat motor 40 which is a brushless motor is accommodated inside the motor accommodation room MS. In addition, a sensor substrate 50 in which three Hall sensors (magnetic sensors) HS (see FIG. 5) detecting the rotation state of the flat motor 40 (rotor 42) are provided is accommodated inside the motor accommodation room MS.

As shown in FIG. 3, the case 20 is formed in a substantially bowl shape with steps formed by cast forming using an aluminum material, etc., and includes a large-diameter cylindrical part 21 and a small-diameter cylindrical part 22. The large-diameter cylindrical part 21 is provided on the side (the lower side in the drawing) of the cover 30 in the axial direction of the case 20, and the small-diameter cylindrical part 22 is disposed on the side (the upper side in the drawing) opposite to the side of the cover 30 in the axial direction of the case 20.

A partition wall 23 formed in a substantially disc shape is integrally provided between the large-diameter cylindrical part 21 and the small-diameter cylindrical part 22 in the axial direction of the case 20. The partition wall 23 and the large-diameter cylindrical part 21 form the motor accommodation room MS. In addition, the partition wall 23 and the small-diameter cylindrical part 22 form a decelerator accommodation room RS. That is, the partition wall 23 separates the motor accommodation room MS and the decelerator accommodation room RS.

A through hole 23a through which a rotor shaft 45 passes is provided at the central portion of the partition wall 23. In addition, a first ball bearing B1 rotatably supporting a shaft body 45a of the rotor shaft 45 is installed to the radially inner side of the through hole 23a.

The flat motor 40 accommodated in the motor accommodation room MS has a thickness dimension smaller than the diameter dimension thereof, and is thus formed in a flat shape. The flat motor 40 is an inner rotor-type brushless motor, and includes a stator core (stator) 41 in an annular shape and formed by laminating multiple steel plates and a rotor 42 rotatably provided on the radially inner side of the stator core 41 via a predetermined air gap. The stator core 41 is fixed to the partition wall 23 by using a total of three fixing screws SC2 (see FIG. 4). Accordingly, the rotor 42 is rotated with respect to the stator core 41.

An insulator 43 formed by an insulating material, such as plastics, is installed to the stator core 41. The insulator 43 is equivalent of the holder member in the invention, and holds the stator core 41. The insulator 43 is formed in a substantially annular shape matching the shape of the stator core 41, and covers substantially the entirety of the stator core 41 including multiple teeth TH (see FIG. 6). In addition, multiple coils (conductive wires) 44 are respectively wound by using concentrated windings at corresponding portions of the teeth TH of the insulator 43. That is, the coils 44 are wound on the respective teeth TH of the stator core 41 via the insulator 43.

The rotor 42 includes a body part 42a formed in a substantially bowl shape by pressing a steel plate, etc. A permanent magnet 42b formed in a cylindrical shape is fixed on the radially outer side of the body part 42a. The permanent magnet 42b is magnetized so that N and S poles appear alternately in the circumferential direction of the rotor 42. In addition, the shaft body 45a of the rotor shaft 45 is fixed to the rotation center on the radially inner side of the body part 42a, and the rotor shaft 45 rotates with the rotation of the rotor 42.

The rotor shaft 45 includes the shaft body 45a, a first shaft part 45b, a second shaft part 45c, and a small-diameter part 45d. The axis of the first shaft part 45b is provided at a location offset (eccentric) by a predetermined amount from the axis of the shaft body 45a. Comparatively, the axes of the second shaft part 45c and the small-diameter part 45d are consistent with the axis of the shaft body 45a. The shaft body 45a is rotatably supported by the case 20 via the first ball bearing B1, and the rotor 42 is rotatably supported by the case 20 via the rotor shaft 45.

A hypocycloid decelerator 60, which is a deceleration mechanism, is accommodated in the decelerator accommodation room RS. The hypocycloid decelerator 60 decelerates the rotation of the flat motor 40 (the rotor shaft 45) to be output to the outside, and includes an outer gear 61 and an inner gear 62.

The outer gear 61 is formed in an annular shape, and is disposed near the flat motor 40 in the axial direction of the small-diameter cylindrical part 22. In addition, the radially outer side of the outer gear 61 is fixed to the radially inner side of the small-diameter cylindrical part 22, and a tooth part 61a formed by a flat tooth is formed on the radially inner side of the outer gear 61.

The inner gear 62 is provided on the radially inner side of the outer gear 61, and the outer diameter dimension of the inner gear 62 is smaller than the inner diameter dimension of the outer gear 61. A first tooth part 2a formed by a flat tooth is formed on the radially outer side of the inner gear 62, and the first tooth part 62a of the inner gear 62 is engaged with the tooth part 61a of the outer gear 61. That is, the inner gear 62 rolls without slipping on the inner side of the outer gear 61.

The rotation center of the inner gear 62 is rotatably supported by the first shaft part 45b of the rotor shaft 45 via a pair of second ball bearings B2. Accordingly, when the first shaft part 45 rotates on the radially inner side of the outer gear 61, the inner gear 62 rotatably supported by the pair of second ball bearings B2 is rotated at a speed lower than that of the rotor shaft 45 on the radially inner side of the outer gear 61.

In addition, a second tooth part 62b formed by a flat tooth is formed on the radially inner side of the first tooth part 62a of the inner gear 62. In addition, a tooth part 63a formed by a flat tooth of an output rotator 63 is engaged with the second tooth part 62b. Specifically, a tooth part 63a of the output rotator 63 is disposed on the radially inner side of the second tooth part 62b of the inner gear 62, and the outer diameter dimension of the tooth part 63a is smaller than the inner diameter dimension of the second tooth part 62b of the inner gear 62. Accordingly, the output rotator 63 is rotated without slipping on the radially inner side of the second tooth part 62b in the inner gear 62, and is rotated at a speed lower than that of the inner gear 62.

Here, in the output rotator 63, the radially inner side thereof is rotatably supported by a third ball bearing B3 provided at the second shaft part 45c, and the radially outer side thereof is rotatably supported by a fourth ball bearing B4 provided at a lid member 64. Accordingly, the output rotator 63 which is subjected to a particularly large load is able to rotate smoothly for a long time. In addition, a wheel of the electric carrier (not shown) is fixed to the output rotator 63. Accordingly, the rotation of the flat motor 40 decelerated by the hypocycloid decelerator 60 is transmitted to the wheel of the electric carrier in a high torque state.

The lid member 64 blocks the decelerator accommodation room RS of the case 20. As shown in FIGS. 1 and 2, the lid member 64 is fixed to the small-diameter cylindrical part 22 of the cover 20 by using a total of four fixing screws SC3.

Accordingly, as shown in FIG. 3, the hypocycloid decelerator 60 is in a flat shape and may have a relatively large deceleration ratio (1/90). Accordingly, by adopting the hypocycloid decelerator 60 in the flat electric motor 10, it is possible to cope with further flattening (thinning) of the electric motor 10. Here, "deceleration ratio (1/90)" means that when the rotor shaft 45 rotates 90 rounds at a high speed, the output rotator 63 rotates one round in a state in which the torque gradually increases.

As shown in FIGS. 3 to 5, the cover 30 is formed in a substantially bowl shape through injection molding using a resin material such as plastics. The cover 30 includes a bottom wall part 31 formed in a disc shape and a sidewall part 32 in a cylindrical shape and integrally formed with the outer circumferential portion of the bottom wall part 31. In addition, three power supply wires 70u, 70v, 70w and one sensor cable 80 (see FIG. 5) are respectively inserted into the sidewall part 32 via a grommet 33 (see FIG. 3) functioning as a seal member. Accordingly, rain or dust is prevented from entering the inside of the cover 30.

In addition, a fixing plate 34 (see FIGS. 1 and 3) which prevents the grommet 33 from dropping out is provided on the outer side of the sidewall part 32 and a portion of the grommet 33. The fixing plate 34 is fixed to the sidewall part 32 by using a pair of fixing screws SC4.

Here, as shown in FIG. 5, in the radial direction of the cover 30, a line segment connecting the central portion of the cover 30 and the central portion of the grommet 33 in the circumferential direction of the sidewall part 32 is defined as CT. Also, with the line segment CT as the boundary, a side (upper side in FIG. 5) in the radial direction of the cover 30 is set as a first cover part C1, and the other side (lower side in FIG. 5) in the radial direction of the cover 30 is set as a second cover part C2.

As shown in FIG. 5, a total of three terminal holders 35a, 35b, 35c are provided on the inner side of the sidewall part 32 and the side of the first cover part C1. The terminal holders 35a, 35b, 35c are each formed in a hollow box shape, and a flat-type female terminal M1 fixed by caulking to the base end part of a W-phase power supply wire 70w, a flat-type female terminal M2 fixed by caulking to the base end part of a U-phase power supply wire 70u, and a flat-type female terminal M3 fixed by caulking to the base end part of a V-phase power supply wire 70v are respectively installed to the terminal holders 35a, 35b, 35c.

In addition, on the inner side of the sidewall part 32, engagement convex parts 36a, 36b that are rod-shaped are respectively formed at the side of the first cover part C1 and the side of the second cover part C2. The engagement convex parts 36a, 36b protrude with a height dimension exceeding the sidewall part 32 of the cover 30, and have a function of guiding the installation of the cover 30 to the case 20 (see FIG. 4). Specifically, at the time of installing the cover 30 to the case 20, the engagement convex parts 36a, 36b are firstly inserted into the engagement concave parts (not shown) of the case 20.

Accordingly, the cover 30 is accurately positioned with respect to the case 20, and it is possible to install the cover 30 and the case 20 to each other reliably. It is noted that, by installing the cover 30 to the case 20, flat-type male terminals T1, T2, T3 (see FIGS. 4 and 6) are accurately electrically connected to the respective flat-type female terminals M1, M2, M3.

Here, the flat-type male terminal T1 connected to the flat-type female terminal M1 (for W-phase) is electrically connected to the coil 44 corresponding to W-phase, the flat-type male terminal T2 connected to the flat-type female terminal M2 (for U-phase) is electrically connected to the coil 44 corresponding to U-phase, and the flat-type male terminal T3 connected to the flat-type female terminal M3 (for V-phase) is electrically connected to the coil 44 corresponding to the V-phase.

Accordingly, by supplying a driving current to the respective power supply wires 70u, 70v, 70w at a predetermined timing, the coils 44 corresponding to U-phase, V-phase, and W-phase (see FIGS. 4 and 6) are respectively supplied with power, and an electromagnetic force is generated in the stator core 41 (see FIGS. 4 and 6). Accordingly, the rotor 42 (see FIGS. 3 and 4) is driven to be rotated at a predetermined rotation speed in a forward direction of a reverse direction.

In addition, as shown in FIG. 5, the sensor substrate 50 and a dropout prevention plate 90 are accommodated in the cover 30. The dropout prevention plate 90 prevents the respective power supply wires 70u, 70v, 70w and the sensor cable 80 installed to the inner side of the cover 30 from dropping out from the cover 30.

Three first holding grooves G1 respectively and individually holding the respective power supply wires 70u, 70v, 70w are provided on the side of the first cover part C1 in the bottom wall part 31 of the cover 30. Accordingly, it is possible to arrange the respective power supply wires 70u, 70v, 70w on the inner side of the cover 30 without interfering and intersecting with each other.

In addition, a second holding groove G2 holding the sensor cable 80 is provided on the side fo the second cover part C2 in the bottom wall part 31 of the cover 30. Here, the sensor cable 80 is thicker than each of the power supply wires 70u, 70v, 70w. Accordingly, the width dimension of the second holding groove G2 is greater than the width dimension of the first holding groove G1.

In addition, a relatively large accommodation space SP accommodating the sensor cable 80 is provided in the vicinity of the second holding groove G2 on the side of the second cover part C2 of the cover 30. In this way, it is possible to greatly curve the sensor cable 80 with relaxation on the inner side of the cover 30. Accordingly, it is possible to arrange the sensor cable 80 without unreasonably bending the sensor cable 80 between the sensor substrate 50 and the second holding groove G2.

In this way, by setting the line segment CT dividing up the cover 30 as the center, the U-phase, V-phase, and W-phase power supply wires 70u, 70v, 70w are disposed on the side of the first cover part C1 in the radial direction, and the sensor cable 80 is disposed on the second cover part C2 on the other side in the radial direction. Accordingly, on the inner side of the cover 30, the respective power supply wires 70u, 70v, 70w and sensor cable 80 do not contact or intersect with each other.

Accordingly, a short circuit between the respective power supply wires 70u, 70v, 70w and the sensor cable 80 is reliably suppressed, and the reliability of the electric motor 10 is facilitated. Moreover, the respective power supply wires 70u, 70v, 70w and sensor cable 80 can be easily arranged with respect to the cover 30. As a result, the operability of assembling the electric motor 10 is facilitated.

Here, the sensor substrate 50 is fixed to the inner side of the cover 30 to cross the line segment CT. Specifically, the sensor substrate 50 is fixed to the inner side of the cover 30 through a pair of fixing screws SC5 (see FIG. 5). In addition, the sensor substrate 50 is a printed circuit board on which multiple electronic components, including the three Hall sensors HS, are soldered and which function as electronic circuits.

The three Hall sensors HS provided on the sensor substrate 50 are arranged in a predetermined interval in the longitudinal direction of the sensor substrate 50. The Hall sensors HS detect the rotation state (rotation speed, etc.) of the rotor 42, and face the permanent magnet 42b in the axial direction of the rotor 42 (see FIGS. 3 and 4). Accordingly, the Hall sensors HS perform switching through the switching between the N polarity and the S polarity of the permanent magnet 42b as the rotor 42 rotates and output square wave signals respectively at predetermined timings.

In addition, the sensor cable 80 is electrically connected with the sensor substrate 50, and the square wave signals from the three Hall sensors HS are transmitted through the sensor cable 80. Here, the connection portion of the sensor cable 80 with the sensor substrate 50 is a portion fixed by soldering and less rigid. Therefore, when a large pulling force is applied to the sensor cable 80, a solder crack (poor conductivity) may occur. Therefore, in the embodiment, to reduce the occurrence of the solder crack, as shown in FIG. 5, the sensor cable 80 is greatly curved with relaxation in the accommodation space SP.

In addition, as shown in FIGS. 1, 2, 4, and 5, a first connector connection part CN1 connected with a power supply external connector (not shown) is provided at a portion of each of the power supply wires 70u, 70v, 70w drawn to the outside of the cover 30. In addition, a second connector connection part CN2 connected with a control external connector (not shown) is provided at a portion of the sensor cable 80 drawn to the outside of the cover 30.

In this way, by separating the cables of the power system (the power supply wires 70u, 70v, 70w) and the cable of the control system (the sensor cable 80), the adverse influence of the electrical noise, etc., emitted from the cables of the power system on the cable of the control system is suppressed.

As shown in FIG. 5, the dropout prevention plate 90 is formed in a substantially disc-shape by a resin material such as plastics. The dropout prevention plate 90 is provided with a rectangular notch part 93 cut out in a rectangular shape, and the sensor substrate 50 is provided at the portion of the rectangular notch part 93. Accordingly, it is not necessary to overlap the dropout prevention plate 90 and the sensor substrate 50 in the axial direction of the cover 30, and the thickness dimension of the electric motor 10 is prevented from increasing.

In addition, a total of five screw holes 96 arranged in the circumferential direction is provided at a portion on the radially outer side of the dropout prevention plate 90. Fixing screws 96 (five in total) are respectively inserted into the screw holes 96. Accordingly, the dropout prevention plate 90 is fixed to the inner side of the cover 30 without rattling.

In addition, at a portion on the radially outer side of the dropout prevention plate 90, a total of three support protrusions 97 are integrally formed with the circumferential direction thereof. The support protrusions 97 are portions respectively facing the terminal holders 35a, 35b, 35c in the radial direction of the cover 30, and support the sides of the flat-type female terminals M1, M2, M3 (not shown explicitly).

Accordingly, at the time when the flat-type male terminals T1, T2, T3 (see FIGS. 4 and 6) on the side of the case 20 are to be connected to the flat-type female terminals M1, M2, M3, the tilting of the flat-type female terminals M1, M2, M3 is prevented. Accordingly, it is possible to reliably electrically connect the flat-type male terminals T1, T2, T3 to the flat-type female terminals M1, M2, M3.

As shown in FIG. 6, a total of three terminal accommodation boxes 100a, 100b, 100c are integrally formed with the radially outer side of the insulator 43 holding the stator core 41. That is, the terminal accommodation boxes 100a, 100b, 100c are also respectively formed by an insulating material such as plastics. Then, in a state in which the electric motor 10 is assembled, the terminal accommodation boxes 100a, 100b, 100c are arranged to face the respective terminal holders 35a, 35b, 35c (see FIG. 5) provided on the cover 30 from the axial direction of the electric motor 10.

The three terminal accommodation boxes 100a, 100b, 100c are respectively provided for W-phase, U-phase, and V-phase in order, and are formed in shapes substantially the same as each other. Accordingly, the detailed configuration of the terminal accommodation boxes 100a, 100b, 100c is described by using the terminal accommodation box 100a for W-phase as the representative. However, for the convenience of description, the terminal accommodation box is simply labeled as "100" in FIG. 7, (a) and (b) of FIG. 8, and FIG. 10.

In addition, the W-phase, U-phase, and V-phase flat-type male terminals T1, T2, T3 are respectively inserted into the respective terminal accommodation boxes 100a, 100b, 100c. The respective flat-type male terminals T1, T2, T3 are also formed in substantially the same shape. Accordingly, the detailed configuration of the flat-type male terminals T1, T2, T3 is described by using the W-phase flat-type male terminal T1 as the representative. However, for the convenience of description, the flat-type male terminal is labeled as simply "200" in FIG. 7, (a) and (b) of FIG. 8, and (a) and (b) of FIG. 9.

As shown in FIG. 7 and (a) and (b) of FIG. 8, portions of a pair of coil ends 44a (here referring to a pair of W-phase coil ends) of the coil 44 wound on the tooth TH (see FIG. 6) in the terminal accommodation box 100 are electrically connected with each other by the flat-type male terminal 200. Specifically, by accommodating (inserting) the flat-type male terminal 200 in an accommodation room 101 of the terminal accommodation box 100, an enamel coating (not shown) coated on the surface of each coil end 44a is scraped off by the flat-type male terminal 200. Accordingly, the pair of coil ends 44a are electrically connected with each other via the flat-type male terminal 200.

Firstly, regarding the configuration of the flat-type male terminal 200, details are described with reference to the drawings. The flat-type male terminal 200 is equivalent to the connection terminal in the invention. The flat-type male terminal 200 is formed in a three-dimensional shape as shown in FIGS. 7 to 9 by performing a pressing process and a bending process on a brass plate, etc., with an excellent conductive property. Specifically, the flat-type male terminal 200 includes a plate-like terminal connection part 201 inserted into the flat-type female terminal M1 (see FIG. 5) and a terminal body part 202 inserted into the accommodation room 101 of the terminal accommodation box 100.

The terminal connection part 201 stands upright toward the side of the cover 30 in the axial direction of the electric motor 10 in a state in which the flat-type male terminal 200 is fixed to the accommodation room 101 of the terminal accommodation box 101. Accordingly, at the time of assembling the electric motor 10, the terminal connection part 201 is inserted into the flat-type female terminal M1, and the terminal connection part 201 and the flat-type female terminal M1 are electrically connected with each other.

As shown in (a) and (b) of FIG. 9, the terminal body part 202 is formed in a substantially box shape that is hollow, and is inserted into the accommodation room 101 of the terminal accommodation box 100.

In addition, a terminal tip end part 202a facing an accommodation room bottom surface 103 of the accommodation room 101 is provided on the tip end side in the insertion direction of the terminal body part 202 with respect to the accommodation room 101. In addition, a terminal base end part 202b toward the side of the cover 30 in the axial direction of the electric motor 10 is provided on the base end side in the insertion direction of the terminal body part 202 with respect to the accommodation room 101.

In addition, a wide part 203 whose width is greater than the terminal connection part 201 is integrally provided between the terminal connection part 201 and the terminal body part 202 of the flat-type male terminal 200.

A slit 204 is provided in the terminal body part 202. As shown in FIG. 7 and (a) and (b) of FIG. 8, the pair of coil ends 44a are inserted into the slit 204. That is, the slit 204 arranges and holds the pair of coil ends 44a (coil 44) to overlap and in an insertion direction of the terminal body part 202 with respect to the accommodation room 101.

The slit 204 is open on the side of the terminal tip end part 202a, and is cut off by a predetermined depth dimension toward the terminal base end part 202b. Then, on the opening side (the lower side in FIG. 7, (a) and (b) of FIG. 8, and (a) and (b) of FIG. 9) of the slit 204, a coil entrance part 204a is provided. On the side (the upper side in FIG. 7, (a) and (b) of FIG. 8, and (a) and (b) of FIG. 9) opposite to the opening side of the slit 204, a slit bottom part 204*b* formed in a substantially arc shape is provided.

Then, the pair of coil ends 44*a* are disposed between the coil entrance part 204*a* and the slit bottom part 204*b* in the longitudinal direction of the slit 204. An opening width between the coil entrance part 204*a* and the slit bottom part 204*b* in the longitudinal direction of the slit 204 is smaller than the diameter of the coil end 44*a*. Accordingly, the enamel coating coated on the surface of the coil end 44*a* is reliably scraped off, and, as a result, the pair of coil ends 44*a* are reliably electrically connected with each other via the flat-type male terminal 200.

The opening width of the slit 204 may be set to be about a half (½) of the diameter of the coil end 44*a*. Accordingly, the enamel coating is reliably scraped off, and the pull-out strength of the pair of coil ends 44*a* with respect to the flat-type male terminal 200 is sufficiently ensured. Accordingly, the pair of coil ends 44*a* are reliably prevented from being disconnected due to the slit 204.

Since only one slit 204 extending in the insertion direction of the pair of coil ends 44*a* is provided in the terminal body part 202, as shown in (a) and (b) of FIG. 8, the terminal body part 202 is suppressed from having an increased dimension in the width direction (left-right direction in the drawing). This means that, as can be told from FIG. 6, the insulator 43 holding the stator core 41 is suppressed from having an increased dimension toward the radially outer side and, as a result, the electric motor 10 is suppressed from having an increased dimension toward the radially outer side of the electric motor 10.

Moreover, since the terminal body part 202 is suppressed from having an increased dimension in the width direction, the flat-type male terminal 200, as shown in (a) and (b) of FIG. 8, can be formed in a longitudinally elongated shape elongated in the longitudinal direction. Accordingly, it is possible to insert the flat-type male terminal 200 straight into the terminal accommodation box 100 with ease. Thus, the terminal accommodation box 100 is suppressed from being damaged, and, as a result, a defective product is avoided.

As shown in (a) and (b) of FIGS. 8 and 9, on the side of the terminal tip end part 202*a* with respect to the coil entrance part 204*a* of the slit 204, a guiding opening part 205 in which an opening width is gradually increased toward the side (the lower side in the drawing) of the terminal tip end part 202*a* is provided. The guiding opening part 205 serves to guide (induce) the pair of coil ends 44*a* toward the slit 204. Specifically, the opening width of the guiding opening part 205 closest to the terminal tip end part 202*a* is greater than the diameter of the coil end 44*a*. Accordingly, it is possible to reliably and easily insert the pair of coil ends 44*a* set inside the accommodation room 101 and not viewable from the outside of the terminal accommodation box 100 into the slit 204 respectively.

In addition, multiple retaining protrusions 206 which prevent the terminal body part 202 accommodated in the accommodation room 101 from being removed are provided at the terminal body part 202. Specifically, as shown in (a) and (b) of FIG. 8, the retaining protrusions 206 are disposed on two sides (the left and right sides in the drawing) of the terminal body part 202, and the cross-sections thereof are formed to be substantially triangular. Then, the corner parts on the tip end side of the retaining protrusions 206 protrude toward an accommodation room sidewall 104 forming the accommodation room 101, and bite into the accommodation room sidewall 104 to be hooked.

Then, the configuration of the terminal accommodation box 100 is described in detail with reference to the drawings.

As shown in FIG. 7, (a) and (b) of FIG. 8, and FIG. 10, the terminal accommodation box 100 is formed in a rectangular parallelepiped shape. The accommodation room 101 accommodating the terminal body part 202 (see (a) and (b) of FIG. 9) of the flat-type male terminal 200 is formed inside the terminal accommodation box 100.

In addition, the terminal accommodation box 100 includes an accommodation box end surface 102 provided on the opening side (the front side of FIG. 10) of the accommodation room 101 and an accommodation room bottom surface 103 provided on the side (the deep side of FIG. 10) opposite to the opening side of the accommodation room 101. Moreover, the accommodation room sidewall 104 is provided to stand upright from the accommodation room bottom surface 103 toward the opening side of the terminal accommodation box 100. That is, the accommodation room 101 is surrounded by the accommodation room bottom surface 103 and the accommodation room sidewall 104.

Moreover, a pair of insertion regulation concave parts 105 into which the wide part 203 (see (a) and (b) of FIG. 9) of the flat-type male terminal 200 is inserted are provided inside the terminal accommodation box 100. The insertion regulation concave parts 105 form a portion of the accommodation room 101, and have a depth from the accommodation box end surface 102 less than the depth of the accommodation room 101. Specifically, the depth dimension of the insertion regulation concave part 105 is substantially ¼ in depth of the depth dimension of the accommodation room 101 (see (b) of FIG. 8).

In addition, a first inclined wall part 106 introducing the insertion of the terminal body part 202 and the wide part 203 of the flat-type male terminal 200 is provided on the opening side of the accommodation room 101 and the insertion regulation concave parts 105. Specifically, the first inclined wall part 106 are provided throughout the entire circumference on the opening side of the accommodation room 101 and the insertion regulation concave parts 105. Accordingly, it is possible to easily insert the flat-type male terminal 200 into the terminal accommodation box 100.

Moreover, a support protrusion 107 supporting the pair of coil ends 44*a* (see FIG. 7 and (a) of FIG. 8) is provided at the substantially central portion in the accommodation room bottom surface 103 of the terminal accommodation box 100. Specifically, the support protrusion 107 protrudes from the accommodation room bottom surface 103 toward the opening side of the accommodation room 101, and supports the pair of coil ends 44*a* in a state of being overlapped in the protruding direction of the support protrusion 107. In addition, the protrusion height of the support protrusion 107 from the accommodation room bottom surface 103 is substantially ⅓ of the height of the depth dimension of the accommodation room 101 (see (a) of FIG. 8).

Here, the support protrusion 107 enters the inside of the terminal body part 202 in the state in which the terminal body part 202 is inserted into the accommodation room 101. Accordingly, together with the operation of inserting the flat-type male terminal 200 into the terminal accommodation box 100, the pair of coil ends 44*a* supported by the support protrusion 107 are disposed at predetermined positions (effective pressing range) of the slit 204.

Moreover, as shown in FIGS. 7 and 10, a pair of positioning grooves 108 are provided in the terminal accommodation box 100. The positioning grooves 108 are respectively provided on opposite wall parts 109 opposite to each other in the extending direction of the pair of coil ends 44*a*, and are recessed from the accommodation box end surface 102 toward the accommodation room bottom surface 103.

That is, the pair of positioning grooves 108 extend in the axial direction of the insulator 43 (see FIG. 6). Specifically, the depth dimension of each of the positioning grooves 108 is substantially ⅔ in depth of the depth dimension of the accommodation room 101 (see (b) of FIG. 8). In other words, the depth dimension of the positioning groove 108 is a depth dimension which reaches the tip portion of the support protrusion 107.

The opening width of the pair of positioning grooves 108 is slightly greater than the diameter of the pair of coil ends 44a. Accordingly, the pair of coil ends 44a entering the positioning grooves 108 are overlapped in the insertion direction of the flat-type male terminal 200 with respect to the terminal accommodation box 100.

In addition, groove bottom parts 108a are respectively provided on the side opposite to the opening side of the pair of positioning grooves 108. The pair of coil ends 44a entering the positioning grooves 108 are mounted to the groove bottom parts 108a. The pair of groove bottom parts 108a are disposed on the entrance side (the right side of FIG. 7) and the exit side (the left side of FIG. 7) in the insertion direction of the coil ends 44a in the terminal accommodation box 100, and is equivalent to the mounting part of the invention.

Accordingly, by mounting the pair of coil ends 44a to the pair of groove bottom parts 108a on the entrance side and the exit side in the insertion direction of the coil ends 44a in the terminal accommodation box 100, the pair of coil ends 44a are routed in a direction orthogonal to (intersecting with) the insertion direction of the flat-type male terminal 200 toward the terminal accommodation box 100 inside the terminal accommodation box 100.

Therefore, at the time of inserting the flat-type male terminal 200 to the terminal accommodation box 100, the side of the pair of coil terminals 44a mounted to the tip portion of the support protrusion 107 and overlapped in the protruding direction of the support protrusion 107 can face the slit 204 of the flat-type male terminal 200. Accordingly, an unreasonable pulling force can be suppressed from being applied to the pair of coil ends 44a, and, as a result, the disconnection of the coil ends 44a (the coil 44), etc., is prevented.

A second inclined wall part 110 guiding the insertion of the pair of coil ends 44a to the pair of positioning grooves 108 is provided on the opening side of the pair of positioning grooves 108. Accordingly, it is possible to easily insert (arrange) the pair of coil ends 44a into the respective positioning grooves 108.

As shown in FIGS. 6, 11, and 12, in the vicinities of the terminal accommodation boxes 100a, 100b, 100c for W-phase, U-phase, and V-phase, first column parts 150a, 150b, 150c are respective provided to extend in the axial direction of the insulator 43. The first column parts 150a, 150b, 150c are integrally formed with the insulator 43, and the first column parts 150a, 150b, 150c are respectively formed by an insulating material such as plastics. It is noted that the total of three first column parts 150a, 150b, 150c are respective used for W-phase, U-phase, and V-phase in order.

As shown in FIG. 11, the first column parts 150a, 150b for W-phase and U-phase are respectively disposed on the base end side (the right side of FIG. 11) in the routing direction of the coil 44 with respect to the terminal accommodation boxes 100a, 100b for W-phase and U-phase. Specifically, the first column parts 150a, 150b for W-phase, U-phase are disposed with a separation distance P1 with respect to the terminal accommodation boxes 100a, 100b for W-phase, U-phase. The separation distance P1 is substantially equal to the distance between adjacent teeth TH (see FIG. 6) in the circumferential direction of the stator core 41.

Notch parts 151a, 151b are respectively provided at the first column parts 150a, 150b. The notch parts 151a, 151b are formed by cutting a predetermined depth from the other side in the axial direction of the insulator 43 toward the side in the axial direction. Then, the pair of coil ends 44a are hooked to notch bottom parts 152a, 152b of the notch parts 151a, 151b. In addition, the opening width of the notch parts 151a, 151b is substantially the same as the opening width of the pair of positioning grooves 108 (see FIG. 10). Accordingly, the pair of coil ends 44a entering the notch parts 151a, 151b and hooked on the notch bottom parts 152a, 152b are overlapped in the axial direction of the insulator 43, that is, the insertion direction of the flat-type male terminal 200 with respect to the terminal accommodation box 100 as shown in (a) and (b) of FIG. 8.

As shown in FIG. 13, a depth dimension D of the notch parts 151a, 151b may be equal to or greater than a "sum" of a width dimension W overlapping the pair of coil ends 44a (i.e., the diameter of the coil end 44a×2 (the number of coil ends)) and a relaxation amount SC (see FIG. 14) when the pair of the coil ends 44a are hooked on the notch bottom parts 152a, 152b. Specifically, "D≥W+SC" may be satisfied. By satisfying such condition, at the time of arranging the pair of coil ends 44a on the insulator 43, the pair of coil ends 44a can be prevented from dropping out from the notch parts 151a, 151b. In other words, the condition defined in "D≥W+SC" is a condition that simplifies an arrangement operation of the pair of coil ends 44a with respect to the notch parts 151a, 151b.

Here, as shown in FIG. 13, the opening direction of the notch parts 151a, 151b and the opening direction of the terminal accommodation boxes 100a, 100b are opposite to each other in the axial direction of the insulator 43. Specifically, the opening direction of the terminal accommodation box 100a, 100b is toward the side (the upper side of FIG. 13) in the axial direction of the insulator 43, and the opening direction of the notch parts 151a, 151b is toward the other side (the lower side of FIG. 13) in the axial direction of the insulator 43.

It is noted that the notch bottom parts 152a, 152b on which the pair of coil ends 44a are hooked are each equivalent to the first conductive wire regulation part of the invention. In addition, as shown in FIG. 11, the notch bottom parts 152a, 152b and the terminal accommodation boxes 100a, 100b are disposed on the other side in the axial direction of the insulator 43.

In addition, as shown in FIGS. 6, 11, and 12, the portion which is close to the stator core 41 in the routing direction of the coil 44 and disposed on the side in the axial direction of the insulator 43 is a coil base part (base end side part) 44b, and the portion which is on the side opposite to the coil base part 44b in the routing direction of the coil 44 and disposed on the other side in the axial direction of the insulator 43 is the coil end (tip end side part) 44a.

In this way, the notch bottom parts 152a, 152b are arranged side-by-side with the terminal accommodation boxes 100a, 100b in the circumferential direction of the insulator 43. In addition, the notch bottom parts 152a, 152b have a function of directing (routing) the pair of coil ends 44a routed from the side in the axial direction of the insulator 43 toward the other side of the axial direction in a direction intersecting with the insertion direction of the flat-type male terminals T1, T2 toward the terminal accommodation boxes 100a, 100b inside the terminal accommodation boxes 100a, 100b.

In addition, as shown in FIG. 13, a height dimension H1 from an end surface Si on the other side in the axial direction of the insulator 43 to the notch bottom parts 152a, 152b is greater than a height dimension H2 from the end surface Si to the groove bottom parts 108a of the terminal accommodation boxes 100a, 100b (H1>H2). In addition, a height difference H3 between the height dimension H1 and the height dimension H2 (i.e., H3=H1−H2) may be equal to or less than the "sum" of the width dimension W overlapping the pair of coil ends 44a and the relaxation amount SC generated when the pair of the coil ends 44a are hooked on the notch bottom parts 152a, 152b. Specifically, "H3≤W+SC" may be satisfied. By satisfying such condition, it is possible to mount the pair of coil ends 44a hooked on the notch bottom parts 152a, 152b with respect to the pair of groove bottom parts 108a (see FIG. 7) provided in the terminal accommodation box 100. In other words, the condition defined in "H3≤W+SC" is a condition so that an unreasonable pulling force is not applied to the pair of coil ends 44a, thereby preventing the disconnection, etc., of the pair of coil ends 44a.

Moreover, as shown in FIGS. 6, 11, and 12, in the vicinities of the terminal accommodation boxes 100a, 100b, 100c for W-phase, U-phase, and V-phase and on the side opposite to the side of the terminal accommodation boxes 100a, 100b, 100c with respect to the first column parts 150a, 150b, 150c in the circumferential direction of the insulator 43, second column parts 153a, 153b, 153c are respectively provided to extend in the axial direction of the insulator 43. The second column parts 153a, 153b, 153c are integrally formed with the insulator 43, and are respectively formed by an insulating material such as plastics. It is noted that the total of three second column parts 153a, 153b, 153c are respective used for W-phase, U-phase, and V-phase in order.

As shown in FIG. 11, the second column parts 153a, 150b for W-phase, U-phase are respectively disposed on the side of the stator core 41 (the right side of FIG. 11) in the routing direction of the coil 44 with respect to the first column parts 150a, 150b for W-phase, U-phase. Specifically, the second column parts 153a, 153b for W-phase, U-phase are disposed with a separation distance P2 with respect to the first column parts 150a, 150b for W-phase, U-phase. The separation distance P2 is substantially the same as the separation distance P1 (P2≈P1).

Convex parts 154a, 154b are respectively provided at the second column parts 153a, 153b. The convex parts 154a, 154b protrude by a predetermined height on the side in the axial direction of the insulator 43, and portions of the coil base parts 44 near the coil ends 44a and disposed on the side in the axial direction of the insulator 43 are hooked on the convex parts 154a, 154b. The protrusion height of the convex parts 154a, 154b is in substantially the same dimension as the width dimension W (see FIG. 13) obtained by overlapping the pair of coil ends 44a. Accordingly, the pair of coil base parts 44b hooked on the convex parts 154a, 154b are prevented from dropping out from the convex parts 154a, 154b.

Here, the pair of convex parts 154a, 154b are respectively provided on the side in the axial direction of the insulator 43, and are equivalent to the second conductive wire regulation part of the invention. In addition, as shown in a portion of the convex part 154b in FIG. 11, for example, by hooking a portion of the pair of coil base parts 44b near the coil ends 44a on the convex part 154b, it is possible to arrange a portion of the coil base part 44b closer to the stator core 41 than the hooked portion of the coil base part 44b with respect to the convex part 44b along the circumferential direction of the insulator 43 in the routing direction of the coil 44.

In this way, it is possible to effectively prevent a short circuit of the coil base part 44b disposed on the side in the axial direction of the insulator 43 and extending toward the convex part 154b with respect to the flat-type male terminal T1 (W-phase) disposed between the convex part 154b (for U-phase) and the first column part 150a (W-phase). In this way, the convex parts 154a, 154b both serve to arrange the coil base parts 44b along the circumferential direction of the insulator 43 on the side in the axial direction of the insulator 43.

Here, as shown in FIG. 12, the positions where the terminal accommodation box 100c, the first column part 150c, and the second column part 153c for V-phase are arranged in the circumferential direction of the insulator 43 are reversed with respect to the terminal accommodation boxes 100a, 100b, the first column parts 150a, 150b, and the second column parts 153a, 153b for W-phase, U-phase.

Specifically, the first column part 150c for V-phase is disposed on the side (the left side in FIG. 12) opposite to the side of the stator core 41 in the routing direction of the coil 44 with respect to the terminal accommodation box 100c for V-phase. In addition, the second column part 153c for V-phase is disposed on the side (the left side in FIG. 12) opposite to the side of the terminal accommodation box 100c for V-phase with respect to the first column part 150c for V-phase in the circumferential direction of the insulator 43.

However, the separation dimensions of the terminal accommodation box 100c, the first column part 150c, and the second column part 153c for V-phase in the circumferential direction of the insulator 43, the configurations and the functions of a notch part 151c and a notch bottom part 152c (the first conductive wire regulation part) of the first column part 150c for V-phase, and the configurations and the functions of a convex part 154c (the second conductive wire regulation part) of the second column part 153c for V-phase are respectively the same as those for W-phase and U-phase. Therefore, the repeated detailed description of the first column part 150c for V-phase and the second column part 153c for V-phase of the terminal accommodation box 100c for V-phase is omitted.

The first column part 150c for V-phase is the same as those for W-phase and V-phase regarding the points that "D≥W+SC" and "H3≥W+SC" may be satisfied (see FIG. 16). Also, since the arrangement positions and the routing direction of the coil 44 for the terminal accommodation box 100c, the first column part 150c, and the second column part 153c for V-phase are reversed with respect to those for W-phase, U-phase, the second column part 153c (the convex part 154c) is not used (see FIG. 12) in the process of arranging the coil 44 (the coil base part 44b and the coil end 44a).

In addition, the manufacturing method of the electric motor 10 formed as above, in particular, the method for electrical connection of the pair of coil ends 44a by using the flat-type male terminals T1, T2, T3 in the terminal accommodation boxes 100a, 100b, 100c, is described in detail with reference to the drawings. Since the portions of the terminal accommodation boxes 100a, 100b are respectively substantially the same, only the portion of the terminal accommodation box 100b and the flat-type male terminal T2 for U-phase are described by using FIGS. 13, 14, and 15.

[First Arrangement Process (U-Phase)]

Firstly, as indicated by an arrow (1) of FIG. 13, on the side (the upper side in the drawing) in the axial direction of the insulator 43, a portion (the coil base part 44b) of the coil 44 drawn out from the stator core 41 is pulled by a predetermined tension while being arranged along the circumferential direction of the insulator 43. At this time, the portion is arranged along the inner side of the convex parts 154a, 154b of the second column parts 153a, 153b (the radially inner side of the insulator 43). Accordingly, the first arrangement process ends. The first arrangement process is equivalent to the first process of the invention.

[First Hooking Process (U-Phase)]

Then, as indicated by an arrow (2) of FIG. 13, a portion of the coil base part 44b near the coil end 44a and disposed on the side in the axial direction of the insulator 43 is routed toward the other side (the lower side in the drawing) in the axial direction of the insulator 43. At this time, the portion is hooked on the convex part 154b for U-phase. Accordingly, the first hooking process ends. The first hooking process is equivalent to the hooking process of the invention.

[Second Hooking Process (U-Phase)]

Then, as indicated by an arrow (3) of FIG. 14, the pair of coil ends 44a routed to the other side (the lower side of the figure) in the axial direction of the insulator 43 is folded back 180 degrees toward the side (the upper side of the drawing) in the axial direction of the insulator 43 and hooked on the notch bottom part 152b in the notch part 151b of the first column part 150b. At this time, a relatively large tension may be applied for pulling in the direction of an arrow (4). Accordingly, the relaxation amount SC is reduced, and the pair of coil ends 44a can be reliably prevented from dropping out from the notch part 151b. However, in order to prevent the coil 44 from being damaged, disconnected, etc., the pair of coil ends 44a are pulled with a suitable tension, while the state on the side of the coil base part 44b is monitored. Accordingly, the second hooking process ends. The second hooking process is equivalent to the second process of the invention.

[Second Arrangement Process (U-Phase)]

Then, as indicated by an arrow (5) of FIG. 15, the pair of coil ends 44a hooked on the notch bottom part 152b of the first column part 150b are inserted through the terminal accommodation box 100b arranged in the circumferential direction of the insulator 43. At this time, a predetermined tension is applied to the pair of coil ends 44a, while the pair of coil ends 44a are inserted into the pair of positioning grooves 108 (see FIG. 10) from the opening side of the terminal accommodation box 100b. Accordingly, the redundant relaxation of the pair of coil ends 44a is removed, and the routing direction of the pair of coil ends 44a inside the terminal accommodation box 100b is directed straight to the circumferential direction of the insulator 43. That is, the routing direction of the pair of coil ends 44a is directed toward a direction intersecting with the insertion direction of the flat-type male terminal T2 inserted into the terminal accommodation box 100b. Accordingly, the pair of coil ends 44a are respectively mounted to the groove bottom parts 108a of the pair of positioning grooves 108 (see FIG. 7). Accordingly, the second arrangement process ends. The second arrangement process is equivalent to the third process of the invention.

[Terminal Connection Process (U-Phase)]

Then, as indicated by an arrow (6) of FIG. 15, the pair of coil ends 44a are pulled by a predetermined tension in the state of being mounted to the groove bottom parts 108a of the positioning grooves 108 and, as indicated by an arrow (7), the flat-type male terminal T2 is inserted into the terminal accommodation box 100b. At this time, the flat-type male terminal T2 is moved straight with respect to the terminal accommodation box 100b from the side in the axial direction of the insulator 43, that is, from the direction intersecting with the pair of coil ends 44a. Then, the flat-type male terminal T2 is pressed to the terminal accommodation box 100b with a predetermined pressure. Accordingly, the pair of coil ends 44a supported by the support protrusion 107 (see FIG. 7) are disposed at the predetermined position (effective pressing range) of the slit 204 (see FIG. 7) and electrically connected with each other. At this time, since the pair of coil ends 44a are respectively mounted to the groove bottom parts 108a (see FIG. 7) of the pair of positioning grooves 108, an unreasonable pulling force is suppressed from being applied to the pair of coil ends 44a when the flat-type male terminal T2 is pressed to the terminal accommodation box 100b. Accordingly, the disconnection, etc., of the coil ends 44a (coil 44) is reliably prevented. Accordingly, the terminal connection process ends. The terminal connection process is equivalent to the fourth process of the invention.

In addition, at the portion of the terminal accommodation box 100c for V-phase and the flat-type male terminal T3, the arrangement process and the electrical connection process of the pair of coil ends are performed as shown in FIGS. 16, 17, and 18.

[First Arrangement Process (V-Phase)]

Firstly, as indicated by an arrow (8) of FIG. 16, on the side (the upper side in the drawing) in the axial direction of the insulator 43, a portion (the coil base part 44b) of the coil 44 drawn out from the stator core 41 is pulled by a predetermined tension while being arranged along the circumferential direction of the insulator 43. At this time, the portion is arranged along the inner side of the first column part 150 (the radially inner side of the insulator 43). Accordingly, the first arrangement process (first process) ends.

[Hooking Process (V-Phase)]

Then, as indicated by an arrow (9) of FIG. 16, a portion of the coil base part 44b near the coil end 44a and disposed on the side in the axial direction of the insulator 43 is routed toward the other side (the lower side in the drawing) in the axial direction of the insulator 43. At this time, in the circumferential direction of the insulator 43, the portion of the coil base part 44b is routed from the side opposite to the side of the terminal accommodation box 100c with respect to the first column part 150c toward the other side (the lower side in the drawing) in the axial direction of the insulator 43. Then, as indicated by an arrow (10) of FIG. 17, the pair of coil ends 44a routed to the other side (the lower side of the drawing) in the axial direction of the insulator 43 is folded back 180 degrees toward the side (the upper side of the drawing) in the axial direction of the insulator 43 and hooked on the notch bottom part 152c in the notch part 151c of the first column part 150c. At this time, a relatively large tension may be applied for pulling in the direction of an arrow (11). Accordingly, like the above, the relaxation amount with respect to the notch bottom part 152c is reduced, and the pair of coil ends 44a can be reliably prevented from dropping out from the notch part 151c. However, in order to prevent the coil 44 from being damaged, disconnected, etc., the pair of coil ends 44a are pulled with a suitable tension, while the state on the side of the coil base part 44b is monitored. Accordingly, the hooking process (second process) ends.

[Second Arrangement Process (V-Phase)]

Then, as indicated by an arrow (12) of FIG. 18, the pair of coil ends 44a hooked on the notch bottom part 152c of the first column part 150c are inserted through the terminal accommodation box 100c arranged in the circumferential direction of the insulator 43. At this time, a predetermined tension is applied to the pair of coil ends 44a, while the pair of coil ends 44a are inserted into the pair of positioning grooves 108 (see FIG. 10) from the opening side of the terminal accommodation box 100c. Accordingly, the redundant relaxation of the pair of coil ends 44a is removed, and the routing direction of the pair of coil ends 44a inside the terminal accommodation box 100c is directed straight to the circumferential direction of the insulator 43. That is, the routing direction of the pair of coil ends 44a is directed toward a direction intersecting with the insertion direction of the flat-type male terminal T3 inserted into the terminal accommodation box 100c. Accordingly, the pair of coil ends 44a are respectively mounted to the groove bottom parts 108a (see FIG. 7) of the pair of positioning grooves 108. Accordingly, the second arrangement process (third process) ends.

[Terminal Connection Process (V-Phase)]

Then, as indicated by an arrow (13) of FIG. 18, the pair of coil ends 44a are pulled by a predetermined tension in the state of being mounted to the groove bottom parts 108a of the positioning grooves 108 and, as indicated by an arrow (14), the flat-type male terminal T3 is inserted into the terminal accommodation box 100c. At this time, the flat-type male terminal T3 is moved straight with respect to the terminal accommodation box 100c from the side in the axial direction of the insulator 43, that is, from the direction intersecting with the pair of coil ends 44a. Then, the flat-type male terminal T3 is pressed to the terminal accommodation box 100c with a predetermined pressure. Accordingly, the pair of coil ends 44a supported by the support protrusion 107 (see FIG. 7) are disposed at the predetermined position (effective pressing range) of the slit 204 (see FIG. 7) and electrically connected with each other. At this time, since the pair of coil ends 44a are respectively mounted to the groove bottom parts 108a (see FIG. 7) of the pair of positioning grooves 108, an unreasonable pulling force is suppressed from being applied to the pair of coil ends 44a when the flat-type male terminal T3 is pressed to the terminal accommodation box 100c. Accordingly, the disconnection, etc., of the coil ends 44a is reliably prevented. Accordingly, the terminal connection process (fourth process) ends.

In this way, at the portion of the terminal accommodation box 100c for V-phase and the flat-type male terminal T3, the "first hooking process" performed for the portion of U-phase is not required. That is, as shown in FIGS. 16, 17, and 18, in the routing direction of the coil 44 according to the embodiment, the second column part 153c (the convex part 154c) is not used. However, at the portion of the V-phase terminal box 100c and the flat-type male terminal T3, in the case where the routing direction of the coil 44 is reversed to that of the embodiment, the second column part 153c (the convex part 154c) is used.

As explicated above, according to the embodiment, the notch bottom parts 152a, 152b, 152c are respectively arranged side-by-side with the terminal accommodation boxes 100a, 100b, 100c in the circumferential direction of the insulator 43, and the routing direction of the pair of coil ends 44a inside the terminal accommodation boxes 100a, 100b, 100c is directed to a direction intersecting with the insertion direction of the flat-type male terminals T1, T2, T3. Accordingly, at the time of inserting the flat-type male terminals T1, T2, T3 into the terminal accommodation boxes 100a, 100b, 100c, an unreasonable force is suppressed from being applied to the pair of coil ends 44a, and, as a result, a defect such as disconnection of the pair of coil ends 44a can be prevented from occurring. In addition, it is possible to orderly route the pair of coil ends 44a on the insulator 43 via the notch bottom parts 152a, 152b, 152c, and, as a result, a short circuit with the coil 44 of another phase can be prevented.

In addition, according to the embodiment, the coil base part 44b of the coil 44 is disposed on the side in the axial direction of the insulator 43, and the coil end 44a of the coil 44, the terminal accommodation boxes 100a, 100b, 100c, and the notch bottom parts 152a, 152b, 152c are disposed on the other side in the axial direction of the insulator 43. Accordingly, the dimension of the stator core 41 (the insulator 43) in the axial direction can be suppressed from increasing, and, as a result, it is possible to further flatten (reduce the thickness of) the electric motor 10.

Moreover, according to the embodiment, on the side in the axial direction of the insulator 43, the convex parts 154a, 154b, 154c which are provided on the side opposite to the side of the terminal accommodation boxes 100a, 100b, 100c with respect to the notch bottom parts 152a, 152b, 152c and with which the portions of the coil base parts 44b near the coil ends 44a are directed along the circumferential direction of the insulator 43 are provided. Accordingly, the coil 44 of one phase can be prevented from having a short circuit with the coil 44 of another phase disposed nearby.

In addition, according to the configuration of the embodiment, the pair of groove bottom parts 108a (see FIG. 10) on which the pair of coil ends 44a are mounted are respectively provided on the entrance side and the exit side in the insertion direction of the pair of coil ends 44a in the terminal accommodation boxes 100a, 100b, 100c, and the pair of coil ends 44a hooked on the notch bottom parts 152a, 152b, 152c are respectively mounted on the pair of notch bottom part 108a. Accordingly, the side of the pair of coil ends 44a can face the slit 204 of the flat-type male terminal 200 (see FIG. 7). Thus, an unreasonable pulling force can be suppressed from being applied to the pair of coil ends 44a, and, as a result, the disconnection of the coil ends 44a (the coil 44), etc., can be reliably prevented.

Moreover, according to the embodiment, there is no soldering process and the operability for assembling the electric motor 10 is facilitated, and a defect such as a short circuit of the coils 44 between different phases, disconnection of the coil 44, etc., can be suppressed from occurring. Accordingly, the life cycle of the product can be increased, whereas the manufacturing energy can be reduced. Thus, the invention can make contribution to the Sustainable Development Goals (SDGs) advocated by the United Nations, particularly Target 7 (ensure access to affordable, reliable, sustainable and modern energy) and Target 13 (take urgent action to combat climate change and its impacts).

It goes without saying that the invention is not limited to the above embodiment and can be variously modified without departing from the gist thereof. In the embodiment, the electric motor 10 is described as being applicable to an electric carrier carrying harvested farm products. However, the invention is not limited thereto, but is also applicable to devices of other purposes, such as being applied to a drive source of welfare equipment such as a wheelchair device.

In addition, the material, shape, dimensions, number, arrangement location, etc. of each component in the above embodiment are arbitrary as long as the invention can be achieved, and are not limited to the above embodiment.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electric motor, comprising:
a stator, around which a plurality of conductive wires are wound;
a rotor, rotating with respect to the stator; and
a holder member, holding the stator,
wherein the electric motor is provided with:
a terminal accommodation box, which is provided on a radially outer side wall of the holder member and through which the conductive wires are inserted;
a connection terminal, inserted into the terminal accommodation box from a direction intersecting with the conductive wires and electrically connecting the conductive wires with each other; and
a column part, which is provided on the radially outer side wall of the holder member and provided to be arranged side-by-side with the terminal accommodation box with a separation distance in a circumferential direction of the holder member and directing a routing direction of the conductive wires inside the terminal accommodation box to a direction intersecting with an insertion direction of the connection terminal,
wherein the column part is provided with a notch part that is configured to be formed by cutting the column part with a predetermined depth from an other side in an axial direction of the holder member toward a side in the axial direction, and the notch part is provided with a notch bottom part as a first conductive wire regulation part.

2. The electric motor as claimed in claim 1, wherein:
a base end side part of the conductive wire is disposed on the side in the axial direction of the holder member, and
a tip end side part of the conductive wire, the terminal accommodation box, and the first conductive wire regulation part are disposed on the other side in the axial direction of the holder member.

3. The electric motor as claimed in claim 2, comprising:
a second conductive wire regulation part, on the side in the axial direction of the holder member, provided on a side of the first conductive wire regulation part opposite to a side of the terminal accommodation box in the circumferential direction of the holder member and arranging the conductive wires along the circumferential direction of the holder member.

4. The electric motor as claimed in claim 1, wherein:
in the terminal accommodation box, mounting parts on which the conductive wires are mounted are respectively provided on an entrance side and an exit side in the insertion direction of the conductive wires, and
the conductive wires hooked on the first conductive wire regulation parts are respectively mounted on the mounting parts.

5. The electric motor as claimed in claim 2, wherein:
in the terminal accommodation box, mounting parts on which the conductive wires are mounted are respectively provided on an entrance side and an exit side in the insertion direction of the conductive wires, and
the conductive wires hooked on the first conductive wire regulation parts are respectively mounted on the mounting parts.

6. The electric motor as claimed in claim 3, wherein:
in the terminal accommodation box, mounting parts on which the conductive wires are mounted are respectively provided on an entrance side and an exit side in the insertion direction of the conductive wires, and
the conductive wires hooked on the first conductive wire regulation parts are respectively mounted on the mounting parts.

7. A manufacturing method of an electric motor, the electric motor comprising:
a stator, around which a plurality of conductive wires are wound;
a rotor, rotating with respect to the stator; and
a holder member, holding the stator,
wherein the manufacturing method of the electric motor comprises:
a first process of arranging the conductive wires along a circumferential direction of the holder member on a side in an axial direction of the holder member;
a second process of routing the conductive wires to an other side in the axial direction of the holder member, and hooking the conductive wires on a notch bottom part of a column part, wherein the column part is disposed on a radially outer side wall of the holder member, the column part is provided with a notch part that is configured to be formed by cutting the column part with a predetermined depth from the other side in the axial direction of the holder member toward the side in the axial direction, and the notch part is provided with a notch bottom part as a first conductive wire regulation part;
a third process of inserting the conductive wires hooked on the first conductive wire regulation part into a terminal accommodation box provided side-by-side with the first conductive wire regulation part in the circumferential direction of the holder member, and directing a routing direction of the conductive wires inside the terminal accommodation box to a direction intersecting with an insertion direction of a connection terminal inserted into the terminal accommodation box; and
a fourth process of inserting the connection terminal into the terminal accommodation box in a direction intersecting with the conductive wires, and electrically connecting the conductive wires with each other,
wherein the column part is provided on the radially outer side wall of the holder member and is arranged side-by-side with the terminal accommodation box with a separation distance in a circumferential direction of the holder member.

8. The manufacturing method of the electric motor as claimed in claim 7, wherein:
a second conductive wire regulation part is provided, and, on the side in the axial direction of the holder member, the second conductive wire regulation part is provided on a side of the first conductive wire regulation part opposite to a side of the terminal accommodation box in the circumferential direction of the holder member and arranges the conductive wires along the circumferential direction of the holder member, and
the manufacturing method of the electric motor comprises: between the first process and the second process, a hooking process of hooking the conductive wires on the second conductive wire regulation part.

* * * * *